(12) United States Patent
Cipollini et al.

(10) Patent No.: US 9,193,075 B1
(45) Date of Patent: Nov. 24, 2015

(54) APPARATUS AND METHODS FOR OBJECT DETECTION VIA OPTICAL FLOW CANCELLATION

(71) Applicant: BRAIN Corporation, San Diego, CA (US)

(72) Inventors: Benjamin Neil Cipollini, San Diego, CA (US); Eugene Izhikevich, San Diego, CA (US)

(73) Assignee: Brain Corporation, San Diego, CA (US)

( * ) Notice: Subject to any disclaimer, the term of this patent is extended or adjusted under 35 U.S.C. 154(b) by 368 days.

(21) Appl. No.: 13/689,717

(22) Filed: Nov. 29, 2012

(51) Int. Cl.
*G06N 3/04* (2006.01)
*B25J 13/08* (2006.01)
*G06K 9/40* (2006.01)
*G06N 3/02* (2006.01)

(52) U.S. Cl.
CPC . *B25J 13/08* (2013.01); *G06K 9/40* (2013.01); *G06N 3/02* (2013.01); *Y10S 901/09* (2013.01)

(58) Field of Classification Search
CPC .......... G06N 3/049; G06N 3/02; B25J 13/08; B25J 9/161; B25J 9/1697; G06K 9/40; Y10S 901/09
See application file for complete search history.

(56) References Cited

U.S. PATENT DOCUMENTS

| | | | |
|---|---|---|---|
| 5,063,603 A | 11/1991 | Burt | |
| 5,138,447 A | 8/1992 | Shen | |
| 5,216,752 A | 6/1993 | Tam | |
| 5,272,535 A | 12/1993 | Elabd | |
| 5,355,435 A | 10/1994 | Deyong et al. | |
| 5,638,359 A | 6/1997 | Peltola | |
| 5,673,367 A | 9/1997 | Buckley | |
| 5,875,108 A | 2/1999 | Hoffberg | |
| 6,009,418 A | 12/1999 | Cooper | |
| 6,014,653 A | 1/2000 | Thaler | |

(Continued)

FOREIGN PATENT DOCUMENTS

| | | |
|---|---|---|
| CN | 102226740 A | 10/2011 |
| JP | 4087423 | 3/1992 |

(Continued)

OTHER PUBLICATIONS

Fall Detection Using Modular Neural Networks With Back-Projected Optical Flow, by Huang, Published 2007.*

(Continued)

*Primary Examiner* — Jeffrey A Gaffin
*Assistant Examiner* — Thomas Fink
(74) *Attorney, Agent, or Firm* — Gazdzinski & Associates PC

(57) ABSTRACT

Optical flow for a moving platform may be encoded into pulse output. Optical flow contribution induced due to the platform self-motion may be cancelled. The cancellation may be effectuated by (i) encoding the platform motion into pulse output; and (ii) inhibiting pulse generation by neurons configured to encode optical flow component optical flow that occur based on self-motion. The motion encoded may be coupled to the optical flow encoder via one or more connections. Connection propagation delay may be configured during encoder calibration in the absence of obstacles so as to provide system specific delay matrix. The inhibition may be based on a coincident arrival of the motion spiking signal via the calibrated connections to the optical flow encoder neurons. The coincident motion pulse arrival may be utilized in order to implement an addition of two or more vector properties.

24 Claims, 19 Drawing Sheets

(56) References Cited

U.S. PATENT DOCUMENTS

| | | | |
|---|---|---|---|
| 6,035,389 | A | 3/2000 | Grochowski |
| 6,418,424 | B1 | 7/2002 | Hoffberg |
| 6,458,157 | B1 | 10/2002 | Suaning |
| 6,509,854 | B1 | 1/2003 | Morita |
| 6,545,705 | B1 | 4/2003 | Sigel |
| 6,545,708 | B1 | 4/2003 | Tamayama |
| 6,546,291 | B2 | 4/2003 | Merfeld |
| 6,581,046 | B1 | 6/2003 | Ahissar |
| 6,625,317 | B1 | 9/2003 | Gaffin |
| 7,580,907 | B1 | 8/2009 | Rhodes |
| 7,653,255 | B2 | 1/2010 | Rastogi |
| 7,737,933 | B2 | 6/2010 | Yamano |
| 7,849,030 | B2 | 12/2010 | Ellingsworth |
| 8,000,967 | B2 | 8/2011 | Taleb |
| 8,015,130 | B2 | 9/2011 | Matsugu |
| 8,103,602 | B2 | 1/2012 | Izhikevich |
| 8,160,354 | B2 | 4/2012 | Paquier |
| 8,200,593 | B2 | 6/2012 | Guillen |
| 8,311,965 | B2 | 11/2012 | Breitwisch |
| 8,315,305 | B2 | 11/2012 | Petre |
| 8,390,707 | B2 | 3/2013 | Yamashita |
| 8,416,847 | B2 | 4/2013 | Roman |
| 8,467,623 | B2 | 6/2013 | Izhikevich |
| 2002/0038294 | A1 | 3/2002 | Matsugu |
| 2003/0050903 | A1 | 3/2003 | Liaw |
| 2003/0216919 | A1 | 11/2003 | Roushar |
| 2004/0054964 | A1 | 3/2004 | Bozdagi |
| 2004/0136439 | A1 | 7/2004 | Dewberry |
| 2004/0170330 | A1 | 9/2004 | Fogg |
| 2004/0193670 | A1 | 9/2004 | Langan |
| 2005/0015351 | A1 | 1/2005 | Nugent |
| 2005/0036649 | A1 | 2/2005 | Yokono |
| 2005/0096539 | A1 | 5/2005 | Leibig |
| 2005/0283450 | A1 | 12/2005 | Matsugu |
| 2006/0094001 | A1 | 5/2006 | Torre |
| 2006/0129728 | A1 | 6/2006 | Hampel |
| 2006/0161218 | A1 | 7/2006 | Danilov |
| 2007/0022068 | A1 | 1/2007 | Linsker |
| 2007/0176643 | A1 | 8/2007 | Nugent |
| 2007/0208678 | A1 | 9/2007 | Matsugu |
| 2008/0100482 | A1 | 5/2008 | Lazar |
| 2008/0174700 | A1 | 7/2008 | Takaba |
| 2008/0199072 | A1 | 8/2008 | Kondo |
| 2008/0237446 | A1 | 10/2008 | Oshikubo |
| 2009/0043722 | A1 | 2/2009 | Nugent |
| 2009/0287624 | A1 | 11/2009 | Rouat |
| 2010/0036457 | A1 | 2/2010 | Sarpeshkar |
| 2010/0081958 | A1 | 4/2010 | She |
| 2010/0086171 | A1 | 4/2010 | Lapstun |
| 2010/0100482 | A1 | 4/2010 | Hardt |
| 2010/0166320 | A1 | 7/2010 | Paquier |
| 2010/0225824 | A1 | 9/2010 | Lazar |
| 2010/0235310 | A1 | 9/2010 | Gage |
| 2010/0299296 | A1 | 11/2010 | Modha |
| 2011/0016071 | A1 | 1/2011 | Guillen |
| 2011/0119214 | A1 | 5/2011 | Breitwisch |
| 2011/0119215 | A1 | 5/2011 | Elmegreen |
| 2011/0134242 | A1 | 6/2011 | Loubser |
| 2011/0137843 | A1 | 6/2011 | Poon |
| 2011/0160741 | A1 | 6/2011 | Asano |
| 2011/0206122 | A1 | 8/2011 | Lu |
| 2012/0011090 | A1 | 1/2012 | Tang |
| 2012/0083982 | A1 | 4/2012 | Bonefas |
| 2012/0084240 | A1 | 4/2012 | Esser |
| 2012/0109866 | A1 | 5/2012 | Modha |
| 2012/0303091 | A1 | 11/2012 | Izhikevich |
| 2012/0308076 | A1 | 12/2012 | Piekniewski |
| 2012/0308136 | A1 | 12/2012 | Izhikevich |
| 2013/0073484 | A1 | 3/2013 | Izhikevich |
| 2013/0073491 | A1 | 3/2013 | Izhikevich |
| 2013/0073492 | A1 | 3/2013 | Izhikevich |
| 2013/0073495 | A1 | 3/2013 | Izhikevich |
| 2013/0073496 | A1 | 3/2013 | Szatmary |
| 2013/0073498 | A1 | 3/2013 | Izhikevich |
| 2013/0073499 | A1 | 3/2013 | Izhikevich |
| 2013/0073500 | A1 | 3/2013 | Szatmary |
| 2013/0151450 | A1 | 6/2013 | Ponulak |
| 2013/0218821 | A1 | 8/2013 | Szatmary |
| 2013/0251278 | A1 | 9/2013 | Izhikevich |
| 2013/0297539 | A1 | 11/2013 | Piekniewski |
| 2013/0297541 | A1 | 11/2013 | Piekniewski |
| 2013/0297542 | A1 | 11/2013 | Piekniewski |
| 2013/0325766 | A1 | 12/2013 | Petre |
| 2013/0325768 | A1 | 12/2013 | Sinyavskiy |
| 2013/0325773 | A1 | 12/2013 | Sinyavskiy |
| 2013/0325774 | A1 | 12/2013 | Sinyavskiy |
| 2013/0325775 | A1 | 12/2013 | Sinyavskiy |
| 2013/0325777 | A1 | 12/2013 | Petre |
| 2014/0012788 | A1 | 1/2014 | Piekniewski |
| 2014/0016858 | A1 | 1/2014 | Richert |
| 2014/0032458 | A1 | 1/2014 | Sinyavskiy |
| 2014/0032459 | A1 | 1/2014 | Sinyavskiy |
| 2014/0052679 | A1 | 2/2014 | Sinyavskiy |
| 2014/0064609 | A1 | 3/2014 | Petre |
| 2014/0122397 | A1 | 5/2014 | Richert |
| 2014/0122398 | A1 | 5/2014 | Richert |
| 2014/0122399 | A1 | 5/2014 | Szatmary |
| 2014/0156574 | A1 | 6/2014 | Piekniewski |

FOREIGN PATENT DOCUMENTS

| | | |
|---|---|---|
| RU | 2108612 C1 | 10/1998 |
| RU | 2406105 C2 | 12/2010 |
| RU | 2424561 C2 | 7/2011 |
| WO | 2008083335 A2 | 7/2008 |
| WO | 2008132066 A1 | 11/2008 |

OTHER PUBLICATIONS

Computation of Optical Flow Using A Neural Network, by Zhou, Published 1988.*

Visual Navigation With a Neural Network, by Hatsopoulos, Published 1991.*

A Neural Network for Ego-motion Estimation from Optical Flow, by Branka, Published 1995.*

Simei Gomes Wysoski et al., "Fast and adaptive network of spiking neurons for multi-view visual pattern recognition," Neurocomputing, vol. 71, Issues 13-15, Aug. 2008, pp. 2563-2575, ISSN 0925-2312, http://dx.doi.org/10.1016/j.neucom.2007.12.038.

Bohte, 'Spiking Nueral Networks' Doctorate at the University of Leiden, Holland, Mar. 5, 2003, pp. 1-133 [retrieved on Nov. 14, 2012]. Retrieved from the internet: <URL: http://holnepages, cwi ,n11-sbolltedmblica6ond)hdthesislxif>.

Brette et al., Brian: a simple and flexible simulator for spiking neural networks, The Neuromorphic Engineer, Jul. 1, 2009, pp. 1-4, doi: 10.2417/1200906.1659.

Cuntz et al., 'One Rule to Grow Them All: A General Theory of Neuronal Branching and Its Paractical Application' PLOS Computational Biology, 6 (8), Published Aug. 5, 2010.

Davison et al., PyNN: a common interface for neuronal network simulators, Frontiers in Neuroinformatics, Jan. 2009, pp. 1-10, vol. 2, Article 11.

Fidjeland et al., 'Accelerated Simulation of Spiking Neural Networks Using GPUs [online],2010 [retrieved on Jun. 15, 2013], Retrieved from the Internet: URL:http://ieeexplore.ieee.org/xpls/abs_all.jsp?ammber=5596678&tag=1.

Floreano et al., 'Neuroevolution: from architectures to learning' Evol. Intel. Jan. 2008 1:47-62, [retrieved Dec. 30, 2013] [retrieved online from URL:<http://inforscience.epfl.ch/record/112676/files/FloreanoDuerrMattiussi2008.p df>.

Gewaltig et al., 'Nest (Neural Simulation Tool)', Scholarpedia, 2007, pp. 1-15, 2(4): 1430, doi: 1 0.4249/scholarpedia.1430.

Gleeson et al., NeuroML: A Language for Describing Data Driven Models of Neurons and Networks with a High Degree of Biological Detail, PLoS Computational Biology, Jun. 2010, pp. 1-19 vol. 6 Issue 6.

Goodman et al., Brian: a simulator for spiking neural networks in Python, Frontiers in Neuroinformatics, Nov. 2008, pp. 1-10, vol. 2, Article 5.

(56) References Cited

OTHER PUBLICATIONS

Graham, Lyle J. The Surf-Hippo Reference Manual, http://www.neurophys.biomedicale.univparis5. fr/-graham/surf-hippo-files/Surf-Hippo%20Reference%20Manual.pdf, Mar. 2002, pp. 1-128.
Izhikevich, 'Polychronization: Computation with Spikes', Neural Computation, 25, 2006, 18, 245-282.
Izhikevich, 'Simple Model of Spiking Neurons', IEEE Transactions on Neural Networks, Vol. 14, No. 6, Nov. 2003, pp. 1569-1572.
Izhikevich et al., 'Relating STDP to BCM', Neural Computation (2003) 15, 1511-1523.
Karbowski et al., 'Multispikes and Synchronization in a Large Neural Network with Temporal Delays', Neural Computation 12, 1573-1606 (2000).
Nichols, A Re configurable Computing Architecture for Implementing Artificial Neural Networks on FPGA, Master's Thesis, The University of Guelph, 2003, pp. 1-235.
Pavlidis et al. 'Spiking neural network training using evolutionary algorithms. In: Proceedings 2005 IEEE International Joint Conference on Neural Networkds, 2005. IJCNN'05, vol. 4, pp. 2190-2194 Publication Date Jul. 31, 2005 [online][Retrieved on Dec. 10, 2013] Retrieved from the Internet <URL: http://citeseerx.ist.psu.edu/viewdoc/download?doi=10.1.1.5.4346&rep=rep1&type=pdf.
Paugam-Moisy et al., "Computing with spiking neuron networks" G. Rozenberg T. Back, J. Kok (Eds.), Handbook of Natural Computing, Springer-Verlag (2010) [retrieved Dec. 30, 2013], [retrieved online from link.springer.com].
Schemmel et al., 'Implementing synaptic plasticity in a VLSI spiking neural network model in Proceedings of the 2006 International Joint Conference on Neural Networks (IJCNN'06), IEEE Press (2006) Jul. 16-21, 2006, pp. 1-6 [online], [retrieved on Dec. 10, 2013]. Retrieved from the Internet <URL: http://www.kip.uni-heidelberg.de/veroeffentlichungen/download.egi/4620/ps/1774.pdf>.
Sinyavskiy et al. 'Reinforcement learning of a spiking neural network in the task of control of an agent in a virtual discrete environment' Rus. J. Nonlin. Dyn., 2011, vol. 7, No. 4 (Mobile Robots), pp. 859-875, chapters 1-8 (Russian Article with English Abstract).
Szatmary et al., 'Spike-timing Theory of Working Memory' PLoS Computational Biology, vol. 6, Issue 8, Aug. 19, 2010 [retrieved on Dec. 30, 2013]. Retrieved from the Internet: <URL: http://www.ploscompbiol.org/article/info%3Adoi%2F10.1371 %2Fjournal.pcbi.10008 79#>.
Paugam-Moisy et al. 'Computing with spiking neuron networks.' Handbook of Natural Computing, 40 p. Springer, Heidelberg (2009).
Lazar et al. 'Consistent recovery of sensory stimuli encoded with MIMO neural circuits.' Computational intelligence and neuroscience (2010): 2.
Lazar et al. 'Multichannel time encoding with integrate-and-fire neurons.' Neurocomputing 65 (2005): 401-407.
Cessac et al. 'Overview of facts and issues about neural coding by spikes.' Journal of Physiology, Paris 104.1 (2010): 5.
Wang 'The time dimension for scene analysis.' Neural Networks, IEEE Transactions on 16.6 (2005): 1401-1426.
Masquelier, Timothee. 'Relative spike time coding and STOP-based orientation selectivity in the early visual system in natural continuous and saccadic vision: a computational model.' Journal of computational neuroscience 32.3 (2012): 425-441.
Gollisch et al. 'Rapid neural coding in the retina with relative spike latencies.' Science 319.5866 (2008): 11 08-1111.
Dorval et al. 'Probability distributions of the logarithm of inter-spike intervals yield accurate entropy estimates from small datasets.' Journal of neuroscience methods 173.1 (2008): 129.
Sato et al., 'Pulse interval and width modulation for video transmission.' Cable Television, IEEE Transactions on 4 (1978): 165-173.
Lazar et al. 'A video time encoding machine', in Proceedings of the 15th IEEE International Conference on Image Processing (ICIP '08}, 2008, pp. 717-720.
Gluck, Stimulus Generalization and Representation in Adaptive Network Models of Category Learning [online], 1991 [retrieved on Aug. 24, 2013]. Retrieved from the Internet<URL:http://www.google.com/url?sa=t&rct=j&q=Giuck+%22STIMULUS+GENERALIZATION+AND+REPRESENTATIO N+I N+ADAPTIVE+N ETWORK+MODELS+OF+CATEGORY+LEARN I NG%22+1991.
Froemke et al., 'Temporal modulation of spike-timing-dependent plasticity, Frontiers in Synaptic Neuroscience, vol. 2, Article 19, pp. 1-16 [online] Jun. 2010 [retrieved on Dec. 16, 2013]. Retrieved from the internet: <frontiersin.org>.
Berkes et al., Slow feature analysis yields a rich repertoire of complex cell properties. Journal of Vision (2005) vol. 5 (6).
Field et al., Information Processing in the Primate Retina: Circuitry and Coding. Annual Review of Neuroscience, 2007, 30(1), 1-30.
Fiete et al. Spike-Time-Dependent Plasticity and Heterosynaptic Competition Organize Networks to Produce Long Scale-Free Sequences of Neural Activity. Neuron 65, Feb. 25, 2010, pp. 563-576.
Foldiak, Learning invariance from transformation sequences. Neural Computation, 1991, 3(2), 194-200.
Hopfield, (1995) Pattern recognition computation using action potential timing for stimulus representation. Nature 376: 33-36.
Izhikevich et al., (2009) Polychronous Wavefront Computations. International Journal of Bifurcation and Chaos, 19:1733-1739.
Izhikevich, (2004) Which Model to Use for Cortical Spiking Neurons? IEEE Transactions on Neural Networks, 15:1063-1070.
Izhikevich, (2007) Dynamical Systems in Neuroscience: The Geometry of Excitability and Bursting, The MIT Press, 2007.
Janowitz et al., Excitability changes that complement Hebbian learning. Network, Computation in Neural Systems, 2006, 17 (1), 31-41.
Knoblauch et al. Memory Capacities for Synaptic and Structural Plasticity, Neural Computation 2009, pp. 1-45.
Masquelier et al., Learning to recognize objects using waves of spikes and Spike Timing-Dependent Plasticity. Neural Networks (IJCNN), The 2010 International Joint Conference on DOI-10.1109/IJCNN.2010.5596934 (2010) pp. 1-8.
Meister, Multineuronal codes in retinal signaling. Proceedings of the National Academy of sciences. 1996, 93, 609-614.
Meister et al., The neural code of the retina, Neuron. 1999, 22, 435-450.
Oster et al., A Spike-Based Saccadic Recognition System. ISCAS 2007. IEEE International Symposium on Circuits and Systems, 2009, pp. 3083-3086.
Rekeczky et al., "Cellular Multiadaptive Analogic Architecture: A Computational Framework for UAV Applications." May 2004.
Revow et al., 1996, Using Generative Models for Handwritten Digit Recognition, IEEE Trans. on Pattern Analysis and Machine Intelligence, 18, No. 6, Jun. 1996.
Sanchez, Efficient Simulation Scheme for Spiking Neural Networks, Doctoral Thesis, Universita di Granada Mar. 28, 2008, pp. 1-104.
Schnitzer et al., Multineuronal Firing Patterns in the Signal from Eye to Brain. Neuron, 2003, 37, 499-511.
Serrano-Gotarredona et al, "On Real-Time: AER 2-D Convolutions Hardware for Neuromorphic Spike-based Cortical Processing", Jul. 2008.
Szatmary et al., (2010) Spike-Timing Theory of Working Memory. PLoS Computational Biology, 6(8): e1000879.
Thomas et al., 2004, Realistic Modeling of Simple and Complex Cell Tuning in the HMAX Model, and Implications for Invariant Object Recognition in Cortex, AI Memo 2004-017 Jul. 2004.
Thorpe, Ultra-Rapid Scene Categorization with a Wave of Spikes. In H.H. Bulthoff et al. (eds.), Biologically Motivated Computer Vision, Lecture Notes in Computer Science, 2002, 2525, pp. 1-15, Springer-Verlag, Berlin.
Thorpe et al., (2001). Spike-based strategies for rapid processing. Neural Networks 14, pp. 715-725.
Thorpe et al., (2004). SpikeNet: real-time visual processing with one spike per neuron. Neurocomputing, 58-60, pp. 857-864.
Van Rullen et al., Rate Coding versus temporal order coding: What the Retinal ganglion cells tell the visual cortex. Neural computation, 2001, 13, 1255-1283.
Van Rullen et al., (2003). Is perception discrete or continuous? Trends in Cognitive Sciences 7(5), pp. 207-213.
Van Rullen et al., (2005). Spike times make sense. Trends in Neurosciences 28(1).

(56) References Cited

OTHER PUBLICATIONS

Wallis et al., A model of invariant object recognition in the visual system. Progress in Neurobiology. 1997, 51, 167-194.

Wiskott et al., Slow feature analysis: Unsupervised learning of invariances. Neural Computation, 2002, 14, (4), 715-770.

Zarandy et al., "Bi-i: A Standalone Ultra High Speed Cellular Vision System", Jun. 2005.

Sjostrom et al., 'Spike-Timing Dependent Plasticity' Scholarpedia, 5(2):1362 (2010), pp. 1-18.

Florian03, Biologically inspired neural networks for the control of embodied agents, Technical Report Coneural-03-03 Version 1.0 [online], Nov. 30, 2003 [retrieved on Nov. 24, 2014]. Retrieved from the Internet: <URL:http://citeseerx.ist.psu.edu/viewdoc/download-?doi=10.1.1.216.4931&rep1&type=pdf>.

* cited by examiner

APPARATUS AND METHODS FOR OBJECT DETECTION VIA OPTICAL FLOW CANCELLATION

CROSS-REFERENCE TO RELATED APPLICATIONS

This application is related to co-owned U.S. patent application Ser. No. 12/869,573, filed Aug. 26, 2010 and entitled "SYSTEMS AND METHODS FOR INVARIANT PULSE LATENCY CODING", issued as U.S. Pat. No. 8,315,305 on Nov. 20, 2012, co-owned U.S. patent application Ser. No. 12/869,583, filed Aug. 26, 2010, entitled "INVARIANT PULSE LATENCY CODING SYSTEMS AND METHODS", issued as U.S. Pat. No. 8,467,623 on Jun. 18, 2013, co-owned and co-pending U.S. patent application Ser. No. 13/117,048, filed May 26, 2011 and entitled "APPARATUS AND METHODS FOR POLYCHRONOUS ENCODING AND MULTIPLEXING IN NEURONAL PROSTHETIC DEVICES", co-owned and co-pending U.S. patent application Ser. No. 13/152,084, filed Jun. 2, 2011, entitled "APPARATUS AND METHODS FOR PULSE-CODE INVARIANT OBJECT RECOGNITION", and co-owned U.S. patent application Ser.No. 13/689,712, entitled "APPARATUS AND METHODS FOR ENCODING VECTOR FIELD INTO PULSE-CODE OUTPUT", filed on Nov. 29, 2012 and issued as U.S. Pat. No. 9,152,915 on Oct. 6, 2015, each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Field of the Disclosure

The present disclosure relates to object detection using optical flow in spiking neuron networks, for use in robotics, video processing, and machine vision applications.

2. Description of Related Art

Detection of object and distance estimation may be required in a variety of robotics applications for various purposes including obstacle detection and avoidance, target tracking, image dominant plane extraction, movement detection, robot navigation, visual odometry, and/or other purposes. Optical flow (OF) information may be useful for object detection and/or distance measurement.

Existing implementations may employ differential methods for optical flow estimation. Such methods may utilize successive images and solve basic optical flow equations for groups of neighboring pixels within the image, and use the optical flow to estimate distance to obstacles. However, such methods may require substantial computational resources in order to solve nonlinear algebraic equations, high frame rate, and pixel resolution to reduce noise. Optical flow cancellation that utilizes direct estimation of motion may produce noisy results. Optical flow-based object detection techniques may require multiple sensors (e.g., a camera and a range finder, multiple cameras, and/or other sensors) in order to distinguish between a close slowly moving objects and distant faster-moving objects.

SUMMARY

One aspect of the disclosure relates to a computer-implemented method of cancelling optical flow induced by a motion of a robotic apparatus using an artificial spiking neuron network. The method may be performed by one or more processors configured to execute computer program modules. The method may comprise: obtaining an optical flow, the optical flow characterizing a velocity of a plurality of pixels, the plurality of pixels representing at least one object; and based on information characterizing the motion, encoding the optical flow into latency of one or more pulses. The encoding may be configured to prevent generation of the one or more pulses based on the optical flow being based solely on the motion of the robotic apparatus and in absence of motion by the object.

In some implementations, the plurality of pixels may comprise two or more pixel arrays. The optical flow may be characterized by one or more velocity vectors associated with individual ones of the plurality of pixels. The one or more velocity vectors may be determined based on the two or more pixel arrays.

In some implementations, individual ones of the two or more pixel arrays may comprise a first frame of pixels and a second frame of pixels. The first frame may correspond to a first time instance. The second frame may correspond to a second time instance. The one or more velocity vectors may be determined based on a difference of at least one characteristic of a pixel group of the first frame and a pixel group of the second frame.

In some implementations, latencies of individual ones of the one or more pulses may be based on a first magnitude of the one or more velocity vectors.

In some implementations, individual ones of the one or more velocity vectors may comprise a first portion configured to describe a translational velocity component. The first magnitude may comprise a magnitude of the first portion. The latency may be based on a logarithm of the first magnitude.

In some implementations, individual ones of the one or more velocity vectors may comprise a second portion configured to describe a rotational velocity component. The first magnitude may comprise a magnitude of a vector sum of the first portion and the second portion. The latency may be based on a negated logarithm of an absolute value of the vector sum.

In some implementations, the one or more pulses may comprise: a first pulse having first latency, the first pulse being configured to characterize magnitude of first component of the motion; and a second pulse having second latency, the second pulse being configured to characterize magnitude of second component of the motion, the first latency and the second latency being configured is insensitive to a linear transformation of the first and the second motion components.

In some implementations, the second latency may comprise sum of the first latency and a difference component. The linear transformation may be characterized by a proportional parameter and/or may be configured to produce a transformed first component value that is proportional to the magnitude of the first component and/or a transformed second component value that is proportional to the magnitude of the second component. The latency insensitivity may be characterized by a constant value of the difference component associated with the transformed first component and the transformed second component.

Another aspect of the disclosure relates to a robotic apparatus. The robotic apparatus may comprise a platform, a motion sensor, a visual sensor, one or more processors, and/or other components. The platform may comprise a motor. The motor may be configured to physically displace the platform. The motion sensor may be configured to provide a signal conveying information related to the displacement of the platform. The information related to the displacement of the platform may comprise a translational component and a rotational component. The visual sensor may be operably connected to the platform. The visual sensor may be configured to provide a plurality of visual frames representing at least a portion of a surrounding environment of the robotic apparatus. The one or more processors may be configured to execute computer program modules. Execution of the computer program modules may cause the one or more processors to: determine optical flow based on at least two of the plurality of visual frames, the optical flow comprising one or more vectors characterizing a velocity of a plurality of pixels within the at least two of the plurality of visual frames; encode the optical flow into one or more pulses; and provide individual ones of the one or more pulses to the motor.

Yet another aspect of the disclosure relates to a spiking neuron network system configured to encode optical flow. The system may comprise one or more processors configured to execute computer program modules. Execution of the computer program modules causes the one or more processors to: encode motion information into one or more motion pulses; and based on the one or more motion pulses, encode optical flow into one or more pulse latencies. The optical flow may be configured to characterize velocity of at least a portion of a visual data frame.

In some implementations, the encoding of the motion information may be effectuated by neurons of a first portion of the spiking neuron network. The encoding of the optical flow may be effectuated by neurons of a second portion of the spiking neuron network. The first portion and the second portion may form a disjoint set.

In some implementations, the optical flow may be determined based on a first visual frame and a second visual frame. The first frame and the second frame may each comprise a representation of an object. The optical flow may comprise at least one vector based on a velocity of the object. The at least one vector may be characterized by a direction parameter. A first range of values of the direction parameter may be encoded by a first neuron of the second portion.

In some implementations, a second range of values of the direction parameter may be configured to be encoded by a second neuron of the second portion. The second neuron may be distinct from the first neuron when the second range and the first range form a disjoint set.

In some implementations, the least one vector may be characterized by a magnitude parameter. A first range of values of the magnitude parameter may be encodeable by the neuron into a first latency value of the one or more pulse latencies. A second range of values of the magnitude parameter may be encodeable by the neuron into a second latency value of the one or more pulse latencies. The first range and the second range may form a disjoint set. The first latency value may be different from the second latency value.

In some implementations, the motion information comprises a rotational component. The one or more motion pulses may comprise a rotational pulse. The rotational pulse may be associated with a rotation latency. The rotation latency may be proportional to a logarithm of the rotational component.

In some implementations, the motion information may comprise a translational component. The one or more motion pulses may comprise a translational pulse. The translational pulse may be associated with a translation latency. The translation latency may be proportional to a logarithm of the translational component.

In some implementations, the motion information may comprise a rotational component. The one or more motion pulses may comprise a rotational pulse. The rotational pulse may be associated with a rotation latency. The rotation latency may be proportional to a logarithm of the rotational component.

In some implementations, the rotational pulse may be generated by a rotation neuron of the first portion of the spiking neuron network. The translational pulse may be generated by a translational neuron of the first portion of the spiking neuron network. A value of the rotational latency and/or a value of the translational latency may be configured to cause coincident arrival of the rotational pulse and/or the translational pulse at an optical flow encoding neuron of the second group. The optical flow encoding neuron of the second group may be configured to encode a velocity direction range. The velocity direction range may comprise a direction of a vector sum of the rotational component and the translational component.

In some implementations, the rotational pulse may be communicated to neurons of the second group via one or more rotational connections. The one or more rotational connections may be characterized by a rotation efficacy. The translational pulse may be communicated to neurons of the second group via one or more translational connections. The one or more translational connections may be characterized by a translation efficacy. The coincident arrival is characterized by a combined motion efficacy of a unity.

In some implementations, the rotational pulse may be communicated to neurons of the second group via one or more rotational connections. The one or more rotational connections may be characterized by a rotation inhibitory efficacy. The one or more rotational connections may be associated with a rotation inhibitory time interval. The translational pulse may be communicated to neurons of the second group via one or more translational connections. The one or more translational connections may be characterized by a translation inhibitory efficacy. The one or more translational connections may be associated with a translation inhibitory time interval. The encoding of the motion information may be configured to cause an overlap between the rotation inhibitory time interval and the translation inhibitory time interval to suppress pulse generation by the optical flow encoding neuron during the overlap.

In some implementations, the optical flow may comprise at least one vector characterized by a direction parameter. The spiking neuron network may comprise: a first neuron configured to encode at least a portion of the optical flow associated with a first value of the direction parameter; and a second neuron configured to encode at least a portion of the optical flow associated with a second value of the direction parameter, the second value being different than the first value.

Still another aspect of the disclosure relates to a computer-implemented method of calibrating a spiking neuron network configured to determine optical flow of a robot. The method may be performed by one or more processors configured to execute computer program modules. The method may comprise: coupling a first motion encoding neuron to individual neurons of the spiking neuron network via a first plurality of connections, individual ones of the first plurality of connections being characterized by a first delay; providing an optical flow to individual neurons of the spiking neuron network, the optical flow being determined based on a first stream of pixels associated with a first motion type of the robot; and based on a plurality of responses of individual neurons of the spiking neuron network, determining a first plurality of delays of individual ones of the first plurality of connections. The determination of the first plurality of delays may eliminate an optical flow component due to the first motion type of the robot.

In some implementations, the first motion type may comprise translational motion. The first motion encoding neuron may be configured to generate a first pulse based on the translational motion of the robot. A latency of the first pulse may be configured based on magnitude of the translational motion.

In some implementations, the method may comprise: coupling a second motion encoding neuron to individual neurons of the spiking neuron network via a second plurality of connections, individual ones of the second plurality of connections being characterized by a second delay; providing another optical flow to individual neurons of the spiking neuron network, the other optical flow being determined based on a second stream of pixels associated with angular motion of the robot; and based on a plurality of responses of individual neurons of the spiking neuron network, determining a second plurality of delays of individual ones of the second plurality of connections. The determination of the second plurality of delays may eliminate an optical flow component due to the rotational motion of the robot.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

Figure 1A:
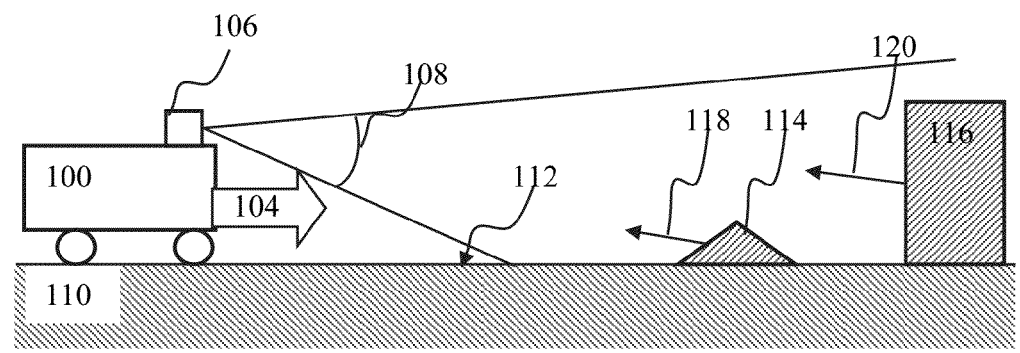
FIG. 1A is a graphical illustration depicting object detection by a robotic device block using optical flow, in accordance with one or more implementations.

All Figures disclosed herein are © Copyright 2012 Brain Corporation. All rights reserved.

DETAILED DESCRIPTION

Implementations of the present disclosure will now be described in detail with reference to the drawings, which are provided as illustrative examples so as to enable those skilled in the art to practice the invention. Notably, the figures and examples below are not meant to limit the scope of the present invention to a single implementation, but other implementations are possible by way of interchange of or combination with some or all of the described or illustrated elements. Wherever convenient, the same reference numbers will be used throughout the drawings to refer to same or like parts.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation In the present disclosure, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote all types of interconnection or communication architecture that is used to access the synaptic and neuron memory. The "bus" could be optical, wireless, infrared and/or another type of communication medium. The exact topology of the bus could be for example standard "bus", hierarchical bus, network-on-chip, address-event-representation (AER) connection, and/or other type of communication topology used for accessing, e.g., different memories in pulse-based system.

As used herein, the terms "computer", "computing device", and "computerized device", include, but are not limited to, personal computers (PCs) and minicomputers, whether desktop, laptop, mainframe computers, workstations, servers, personal digital assistants (PDAs), handheld computers, embedded computers, programmable logic device, personal communicators, tablet computers, portable navigation aids, J2ME equipped devices, cellular telephones, smart phones, personal integrated communication or entertainment devices, and/or other devices capable of executing a set of instructions and processing an incoming data signal.

As used herein, the term "computer program" or "software" is meant to include any sequence or human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), object-oriented environments such as the Common Object Request Broker Architecture (CORBA), Java™ (e.g., J2ME, Java Beans), Binary Runtime Environment (e.g., BREW), and/or other programming languages and/or environments.

As used herein, the terms "connection", "link", "transmission channel", "delay line", "wireless" means a causal link between any two or more entities (whether physical or logical/virtual), which enables information exchange between the entities.

As used herein, the terms "graded signal", "continuous signal", "real-world signal", "physical signal" may describe a non-spiking signal (either analog or non-binary discrete). A non-spiking signal may comprise three or more distinguishable levels.

As used herein, the term "memory" includes any type of integrated circuit or other storage device adapted for storing digital data including, without limitation, ROM, PROM, EEPROM, DRAM, Mobile DRAM, SDRAM, DDR/2 SDRAM, EDO/FPMS, RLDRAM, SRAM, "flash" memory (e.g., NAND/NOR), memristor memory, PSRAM, and/or other storage media.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "network interface" refers to any signal, data, or software interface with a component, network or process including, without limitation, those of the FireWire (e.g., FW400, FW800), USB (e.g., USB2), Ethernet (e.g., 10/100, 10/100/1000 (e.g., Gigabit Ethernet), 10-Gig-E), MoCA, Coaxsys (e.g., TVnet™), radio frequency tuner (e.g., in-band or OOB, cable modem), Wi-Fi (e.g., 802.11), WiMAX (e.g., 802.16), PAN (e.g., 802.15), cellular (e.g., 3G, LTE/LTE-A/TD-LTE, GSM), IrDA families, and/or other network interfaces.

As used herein, the terms "pixel" and "photodetector", are meant generally to include, without limitation, any type of photosensitive circuit and/or device adapted for converting light signal (e.g., photons) into electrical form (e.g., current and/or voltage) and/or digital representation.

As used herein, the terms "pulse", "spike", "burst of spikes", and "pulse train" are meant generally to refer to, without limitation, any type of a pulsed signal, e.g., a rapid change in some characteristic of a signal, e.g., amplitude, intensity, phase or frequency, from a baseline value to a higher or lower value, followed by a rapid return to the baseline value and may refer to any of a single spike, a burst of spikes, an electronic pulse, a pulse in voltage, a pulse in electrical current, a software representation of a pulse and/or burst of pulses, a software message representing a discrete pulsed event, and/or any other pulse and/or pulse type associated with a discrete information transmission system and/or mechanism.

As used herein, the terms "pulse latency", "absolute latency", and "latency" are meant generally to refer to, without limitation, a temporal delay and/or a spatial offset between an event (e.g., the onset of a stimulus, an initial pulse, and/or just a point in time) and a pulse.

As used herein, the terms "pulse group latency", or "pulse pattern latency" refer to, without limitation, an absolute latency of a group (pattern) of pulses that is expressed as a latency of the earliest pulse within the group.

As used herein, the terms "relative pulse latencies" refer to, without limitation, a latency pattern or distribution within a group (or pattern) of pulses that is referenced with respect to the pulse group latency.

As used herein, the term "pulse-code" is meant generally to denote, without limitation, information encoding into a patterns of pulses (or pulse latencies) along a single pulsed channel or relative pulse latencies along multiple channels.

As used herein, the term "synaptic channel", "connection", "link", "transmission channel", "delay line", and "communications channel" are meant generally to denote, without limitation, a link between any two or more entities (whether physical (wired or wireless), or logical/virtual) which enables information exchange between the entities, and is characterized by a one or more variables affecting the information exchange.

As used herein, the term "Wi-Fi" refers to, without limitation, any of the variants of IEEE-Std. 802.11, related standards including 802.11 a/b/g/n/s/v, and/or other wireless standards.

As used herein, the term "wireless" means any wireless signal, data, communication, or other interface including without limitation Wi-Fi, Bluetooth, 3G (e.g., 3GPP/3GPP2), HSDPA/HSUPA, TDMA, CDMA (e.g., IS-95, WCDMA), FHSS, DSSS, GSM, PAN/802.15, WiMAX (e.g., 802.16), 802.20, narrowband/FDMA, OFDM, PCS/DCS, LTE/LTE-A/TD-LTE, analog cellular, CDPD, satellite systems, millimeter wave or microwave systems, acoustic, infrared (e.g., IrDA), and/or other wireless interfaces.

Figure 2A:
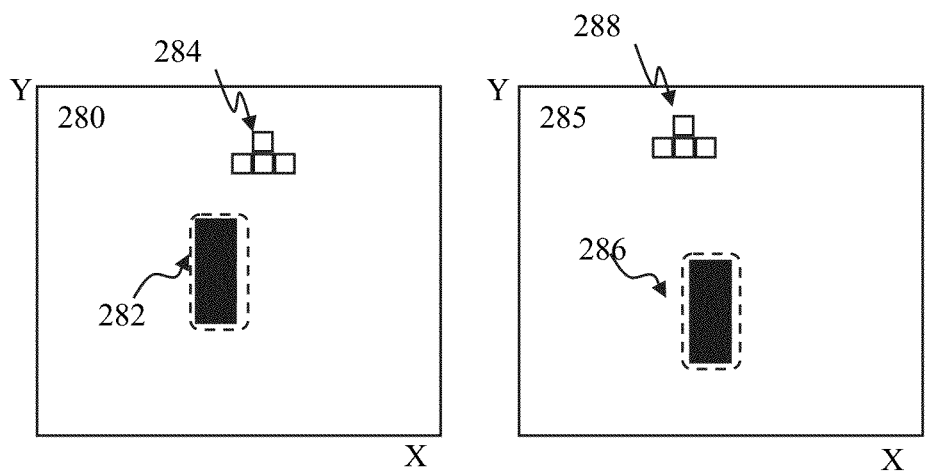
FIG. 2A is a graphical illustration depicting optical flow determination based on two frames of pixels, in accordance with one or more implementations.

The present disclosure provides, among other things, a computerized apparatus and methods for facilitating cancellation of optical flow component induced, for example, by self-motion of a robotic platform and/or camera. FIG. 1A illustrates a generalized approach to object tracking using optical flow, in accordance with one or more implementations. A mobile robotic apparatus (e.g., a rover) 100 may comprise a camera 106. The camera 106 may be characterized by a field of view 108. The camera 106 may provide information associated with objects within the field-of-view. In some implementations, the camera 106 may provide frames of pixels of luminance, refreshed at 25 Hz frame rate, such as the frames 280, 285 shown in FIG. 2A, described below.

One or more objects (e.g., a stationary object 114 and a moving object 116) may be present in the camera field of view. The motion of the objects may result in a displacement of pixels representing the objects within successive frames, such as shown by pixel groups 282, 286 and 284, 288 in the frames 280, 285, respectively.

When the rover is in motion, such as shown by arrow 104, the optical flow estimated from the image data may comprise the self-motion component and the object motion component. By way of a non-limiting example, the optical flow measured by the rover of FIG. 1A may comprise one or more of (i) self-motion components of the stationary object 118 and the boundary (e.g., the component 112 associated with the floor boundary); (ii) component 120 associated with the moving objects 116 that comprises a superposition of the optical flow components due to the object displacement and the rover displacement; and/or other components.

Figure 1B:
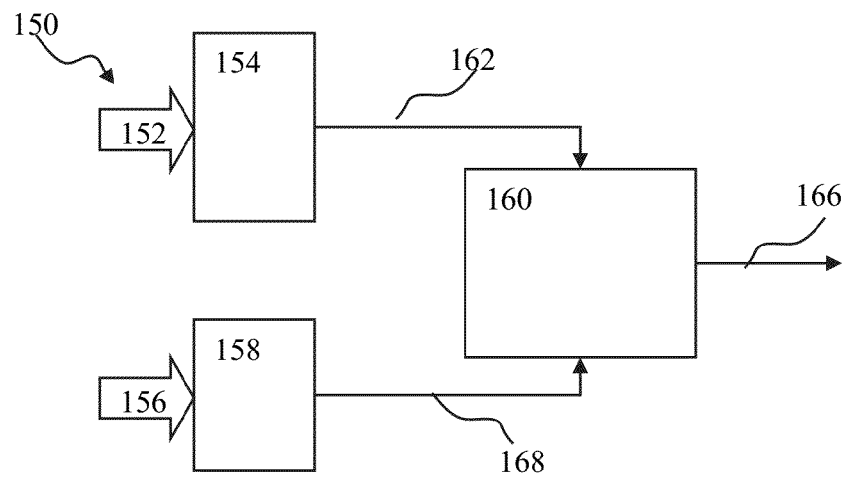
FIG. 1B is a block diagram illustrating an optical flow encoder, in accordance with one or more implementations.

FIG. 1B presents a block diagram of a spiking neuron processing apparatus 150, for use, for example, for encoding optical flow by a robotic apparatus 100 of FIG. 1A, in accordance with one or more implementations. The processing apparatus 150 may comprise optical flow processing block 154 configured to encode optical input signal 152. In one or more implementations, the input 152 may comprise a pixel stream generated by the camera 106 of FIG. 1A. In some implementations, the input 152 may comprise two or more frames of pixel, such as the frames 280, 285 described with respect to FIG. 2A below. The block 154 may generate optical flow output 162. The output 162 may comprise, in one or more implementations, one or more frames (e.g., the frames 200, 210) characterizing a 2-dimensional distribution of optical flow.

In one or more implementations, the frames 280, 285 may comprise 320×240 pixel images provided by the camera 106 at approximately 25 frames per second (fps). The pixels of the frames 280, 285 may comprise may comprise grayscale values with 8-bit resolution.

The pixel data (e.g., the frames 280, 285) may be utilized to obtain optical flow. In some implementations, when the displacement of the image contents (e.g., the pixel group 282, 286) between two nearby instants (e.g., the frames 280, 285) is smaller than the scale of spatial variation of pixel values and approximately constant within the group, the optical flow estimation algorithm may comprise a differential method. The differential method may be based on partial derivatives $I_x(q_i)$, $I_y(q_i)$, $I_t(q_i)$ of the pixels $q_i$ of the image I with respect to position x, y and time t, evaluated at the point i and at the current time, where $q_1, q_2, \ldots, q_n$ represent the pixels within the group (e.g., the pixel group 282, 286). This differential method may be expressed as $$Av=b, \qquad \text{(Eqn. 1)}$$

where $$A = \begin{bmatrix} I_x(q_1) & I_y(q_1) \\ I_x(q_2) & I_y(q_2) \\ \vdots & \vdots \\ I_x(q_n) & I_y(q_n) \end{bmatrix}, v = \begin{bmatrix} V_x \\ V_y \end{bmatrix}, \text{ and } b = \begin{bmatrix} -I_t(q_1) \\ -I_t(q_2) \\ \vdots \\ -I_t(q_n) \end{bmatrix}. \qquad \text{(Eqn. 2)}$$

A solution of Eqn. 1-Eqn. 2 may be found using least squares principle. In some implementations, object tracking (e.g., the pixel groups 282, 284, 286, 288) may be effectuated using a pyramidal feature tracking approach. In some implementations, feature tracking may utilize 15×15 pixel pyramid blocks, three pyramid levels, and a number of iterations 20. Pixel blocks for optical flow determination may be selected using a regular 36×24 grid with a 30-pixel margin from the left, top, right and bottom edges of the frame.

Returning now to FIG. 1B, the processing apparatus 150 may comprise motion data processing block 158 configured to process input signal 156 representing motion of the robotic platform. In one or more implementations, the input may comprise an output of an inertial sensor block. The inertial sensor block may comprise one or more of an acceleration sensor, an acceleration rate of change (i.e., rate) sensors, and/or other sensors. In one or more implementations, the inertial sensor block may comprise a 3-axis accelerometer and/or 3-axis gyroscope. It may be appreciated by those skilled in the arts that various other motion sensors may be used to characterized motion of a robotic platform, such as, for example, radial encoders, range sensors, global positioning system (GPS) receivers, RADAR, SONAR, LIDAR, and/or other sensors.

The block 158 may generate encoded motion output 168. The encoded output 168 may comprise, in one or more implementations, one or more spike outputs. Individual ones of the spike outputs 168 may be configured to characterize one or more translational motion components, and/or one or more rotational motion components, describe in detail below with respect to FIG. 2D. In one or more implementations, the motion encoding block may utilize analog-to-spiking signal conversion using a kernel expansion technique described in detail in co-owned U.S. patent application Ser. No. 13/623, 842, entitled "SPIKING NEURON NETWORK ADAPTIVE CONTROL APPARATUS AND METHODS", filed Sep. 20, 2012, incorporated herein by reference in its entirety. As used herein the terms "analog", and/or "continuous" are used to describe a non-spiking signal, such as a continuous (e.g., analog) and/or discrete (e.g., digital signal). In some implementations, the continuous input signal may include one or more of an analog signal, a polyadic signal with arity greater than 2, an n-bit long discrete signal with n-bits greater than 2, a real-valued signal, and/or other signals.

The optical flow 162 and the encoded motion data 168 may be utilized by optical flow encoder block 160. In some implementations, the encoder block 160 may comprise a network of spiking neurons, such as stochastic neurons described in detail in co-owned U.S. patent application Ser. No. 13/487,533, entitled "SYSTEMS AND APPARATUS FOR IMPLEMENTING TASK-SPECIFIC LEARNING USING SPIKING NEURONS" filed Jun. 4, 2012, and patented as U.S. Pat. No 9,146,546 on Sep. 29, 2015, incorporated herein by reference in its entirety. In one or more implementations, the neuron of the encoder block 160 may be configured in accordance with the neuron process described in detail in co-owned U.S. patent application Ser. No. 13/623,820, entitled "APPARATUS AND METHODS FOR ENCODING OF SENSORY DATA USING ARTIFICIAL SPIKING NEURONS" filed Sep. 20, 2012 and patented as U.S. Pat. No. 9,047,568 on Jun. 2, 2015, incorporated herein by reference in its entirety.

In one or more implementations (not shown), the block 160 may be configured to perform encoding of the motion sensory input 156.

The block 160 may be configured to generate encoded optical flow output 166. In some implementations, the encoding may comprise latency encoding as described with respect to FIGS. 2C-5, below.

In one or more implementations, optical flow values determined from the pixel frames 280, 285 may be encoded into spiking output. The spiking output may comprise one or more spikes. Latency L of individual spikes associated with the optical flow v of individual pixels (and/or groups of pixels) may be expressed as follows:

$$L = C - \log |v|, \quad \text{(Eqn. 3)}$$

where C is a bias term. In one or more implementations, the bias term C may be configured using the maximum available latency, such as, for example, the inter-frame interval of the frames 280, 285 of FIG. 2A. In one or more implementations, the inter-frame interval may be selected at 40 ms.

Figure 1C:
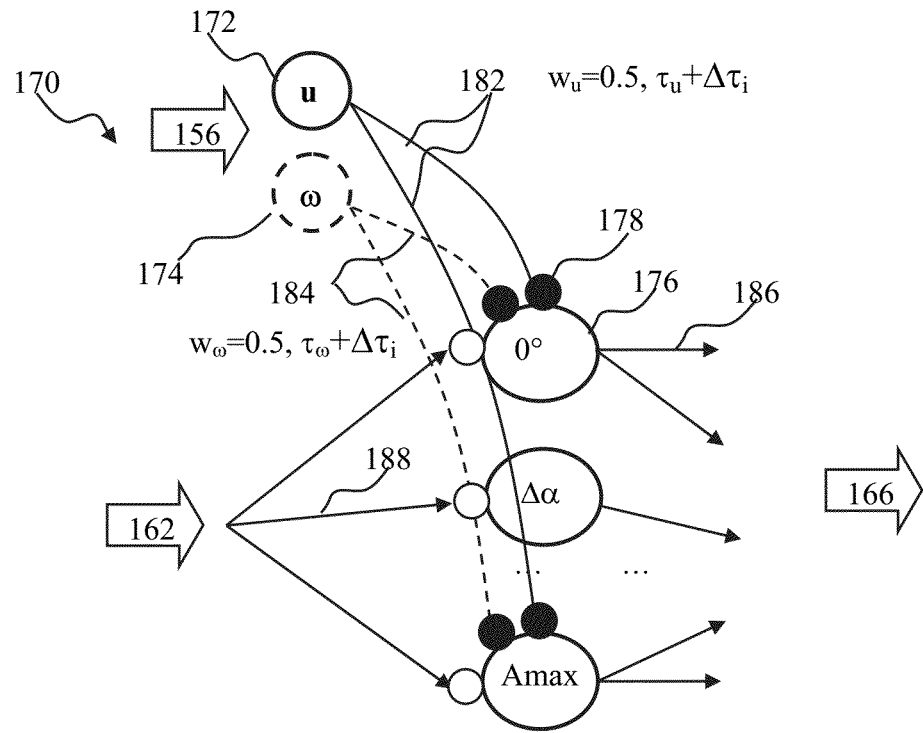
FIG. 1C is a graphical illustration depicting a spiking neuron network useful with the optical flow encoder apparatus of FIG. 1B, in accordance with one or more implementations.

FIG. 1C illustrates an optical flow encoding block (e.g., the block 160 of FIG. 1B) comprising a spiking neuron network 170, in accordance with one or more implementations. The network 170 may be partitioned into two or more parts including: (i) a first portion comprising the neurons 172, 174, which may encode the motion information (e.g., the output 156 of the inertial motion sensor, described above with respect to FIG. 1B) into spike output; and (ii) a second portion comprising one or more neurons 176 configured to encode the optical flow data (e.g., the data of the frames 200, 210) into spikes.

Figure 3:
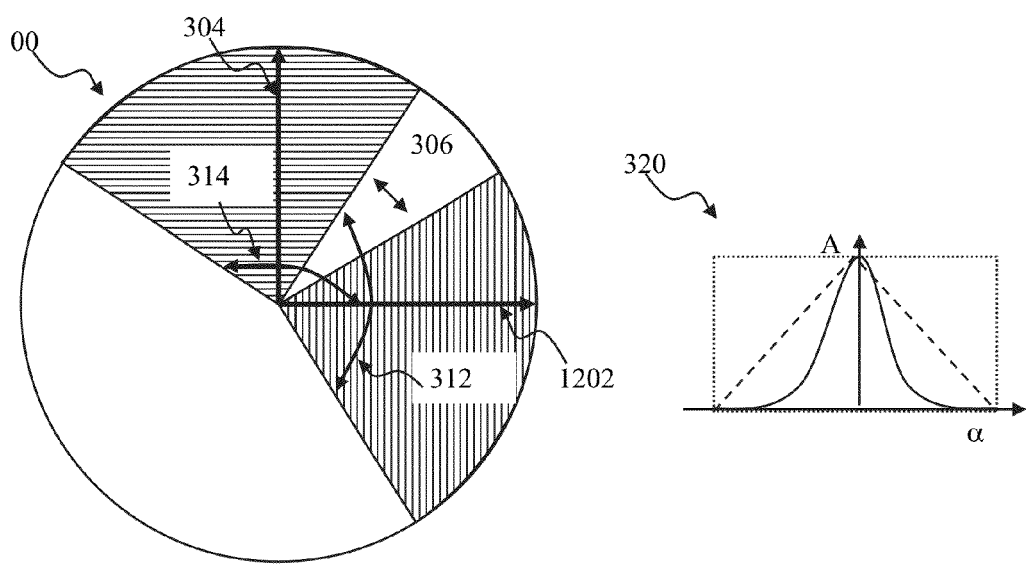
FIG. 3 is a graphical illustration depicting neuron orientation sensitivity, in accordance with one or more implementations.

Individual neurons 176 may be configured to encode optical flow vectors $v_i$ at locations i into spike output. The encoded optical flow output 166 may be provided to an object detection apparatus and/or another processing entity (not shown) via one or more connections 186. For a given location i, individual neurons within the neuron group (e.g., the group encoding the location) may be used to encode optical flow of different orientation. In other words, receptive fields of individual neurons of the neuron groups for individual locations may be configured to be orientation specific, as illustrated in FIG. 3. Arrows 302, 304 denote receptive fields of neurons, which may be configured to encode optical flow at 0° and 90° orientation, respectively. In one or more implementations, the receptive fields of the encoding neurons may be characterized by a directional width, as illustrated by sectors 312, 314 in FIG. 3, corresponding to the arrows 302, 304, respectively. In some implementations, receptive fields of two (or more) neurons may overlap, as illustrated by the overlap segment 306 in FIG. 3. When optical flow direction falls within the receptive fields overlap area (e.g., 306 in FIG. 3), the respective neurons may both generate outputs. In one or more implementations, the receptive fields may be characterized by a weighting function $A(\alpha)$. The weighting function $A(\alpha)$ may include one or more of a rectangular distribution, a Gaussian distribution, a triangular distribution, a trapezoidal distribution, and/or other distributions, such as shown in the panel 320 of FIG. 3.

Returning now to FIG. 1C, the neuron group 176 may comprise neurons configured to encode the optical flow with the orientation from 0° to Amax°, with angular resolution of $\Delta\alpha°$. The angular resolution $\Delta\alpha°$ may be configured based on the specifics of the application and typically is a result of a tradeoff between the encoder complexity and lowest acceptable resolution. Finer resolution may require more neurons. In some implementations where an approximate estimate of object proximity is sufficient, such as detecting large an/or fast moving objects, the neurons 176 of the encoder network 170 may be configured with 90° or 45° of resolution. In one or more implementations where an accurate estimate of distance to objects is thought, such as maneuvering to avoid obstacles depending on the distance, the neurons 176 of the encoder network 170 may be configured with higher resolution (e.g., between 1° and 5°). In some implementations comprising a unidirectional linear motion, a single neuron 176 may be utilized. It will be appreciated by those skilled in the arts, that the above ranges are exemplary and are provided to illustrate applications of the disclosure and various other implementations may be used (e.g., sparse, non-uniform resolution mapping).

The neuron 172 may be configured to encode translational motion vector u into spike output. The motion encoding methodology may be such that translational motion magnitude |u| may be encoded into output spike latency $\theta_u$ as:

$$\tau_u = C_u - \log |u|. \quad \text{(Eqn. 4)}$$

The neuron 174 may be configured to encode the rotational component ω of the motion vector into spike output. The motion encoding methodology may be such that rotational motion magnitude |ω| may be encoded into output spike latency $L_\omega$ as:

$$\tau_\omega = C_\omega - \log |\omega|. \quad \text{(Eqn. 5)}$$

In one or more implementations, the encoding block may comprise neurons (not shown) configured to encode negative values of the translational motion vector u and/or rotational motion vector u into spike output. In some implementations, such negative magnitude encoding neurons and their connections may be configured similar to the neurons 172, 174 in FIG. 1C.

The spike output of the neurons 172 and/or 174 may be provided to one or more neurons 176 via one or more inhibitory connections, denoted by solid lines 182 and broken lines 184 in FIG. 1C, respectively. Individual connections 182, 184 may be characterized by an inhibitory efficacy, denoted by solid circles 178 in FIG. 1C. In some implementations, a spike arriving via the inhibitory connection 182/184 to the neuron 176 may cause the neuron 176 not to respond to pre-synaptic input 168 (e.g., suppress neuron response). In some implementations, such as described in co-owned and co-pending U.S. patent application Ser. No. 13/660,923, entitled "ADAPTIVE PLASTICITY APPARATUS AND METHODS FOR SPIKING NEURON NETWORK", filed Oct. 25, 2012, the foregoing being incorporated herein by reference in its entirety, the inhibitory spike may cause an increment in inhibitory trace of the neuron thereby delaying response generation by the neuron 176. In some implementations, the inhibitory trace (e.g., the effects of an inhibitory spike onto dynamic state of the neuron 176) may be configured to decay with time. The inhibitory effect of such spike may be limited to within a time window from the arrival of the spike when the inhibitory trace is above a threshold, as described in the above cited U.S. patent application Ser. No. 13/660,923. In some implementations, an inhibitory spike may reduce the probability of a response by the neuron 176, as described in detail in co-owned U.S. patent application Ser. No. 13/548,071, entitled "SPIKING NEURON NETWORK SENSORY PROCESSING APPARATUS AND METHODS", filed Jul. 12, 2012 and patented as U.S. Pat. No. 8,977,582 on Mar. 10, 2015, the foregoing being incorporated herein by reference in its entirety.

In one or more implementations, the efficacy of the connections 182, 184 may comprise connection weight w. In one or more implementations, the weight of individual connections may be configured to be less than unity while the combined weight of a pair of connections 182, 184 to the same neuron 176 may be configured to be equal or greater than a unity weight:

$$w_{inh} = w_u + w_\omega, w_{inh} \leq 1. \quad (Eqn. 6)$$

As used hereinafter, an inhibitory efficacy of greater or equal than one may be sufficient to suppress (e.g., inhibit) the response by the target neuron (e.g., the neuron 176). In one implementation, both weights $w_u, w_\omega$ may be selected equal to 0.5. In some implementations, such as, for example, when one of the motion channels may be less reliable (e.g., noisier), the weight of this channel may be reduced while the weight of the other channel increased (e.g., (0.9, 0.3)). As it will be appreciated by those skilled in the arts, a variety of other weight combinations (e.g., (1, 1), (0.99, 0.1), (0.1, 0.99)) may be employed.

In some implementations, translational and/or rotational motion may be obtained using an inertial measurement unit (IMU). The IMU output may comprise real floating point and/or fixed point data stream of acceleration ($\dot{u}_y, \dot{u}_y, \dot{u}_z$), rate of angular rotation ($\dot{\omega}_x, \dot{\omega}_y, \dot{\omega}_z$), velocity ($u_x, u_y, u_z$), angular rotation ($\omega_x, \omega_y, \omega_z$), and/or a combination thereof. In one or more implementations, translational and/or rotational motion may be obtained using two or more distance encoders. One of the encoders may be disposed on the left side of the robotic platform (e.g. the rover 102 in FIG. 1A). Another encoder may be disposed on the right side of the robotic platform. The distance encoders utilize wheel rotation information with a resolution of 1° for a wheel diameter of 0.1 m (4 inches). The distance may be obtained as follows:

$$D = 2\pi R \omega, \quad \omega = \frac{r_L - r_R}{B}, \quad (Eqn. 7)$$

where:
R is the wheel radius;
ω is angular rotation;
$r_L, r_R$ are the left and the right wheel rotation speed; and
B is the wheel track distance.

Figure 2B:
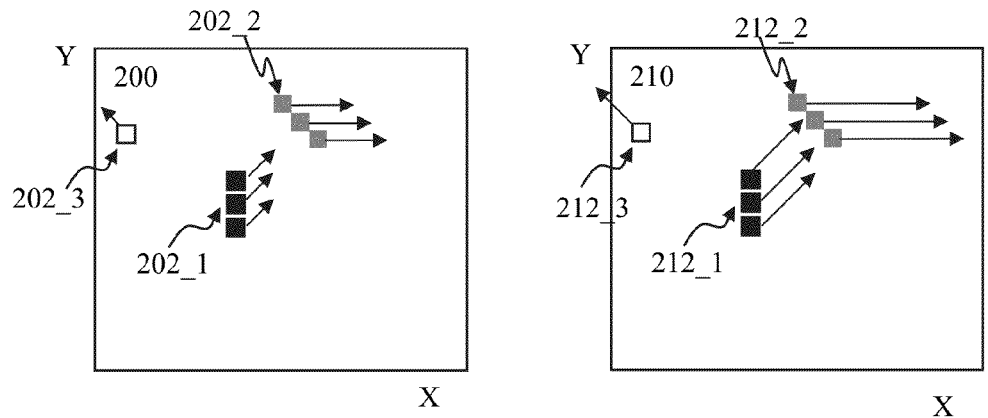
FIG. 2B is a graphical illustration of optical flow field comprising representations of one or more objects moving in one or more directions, in accordance with one or more implementations.
Figure 2C:
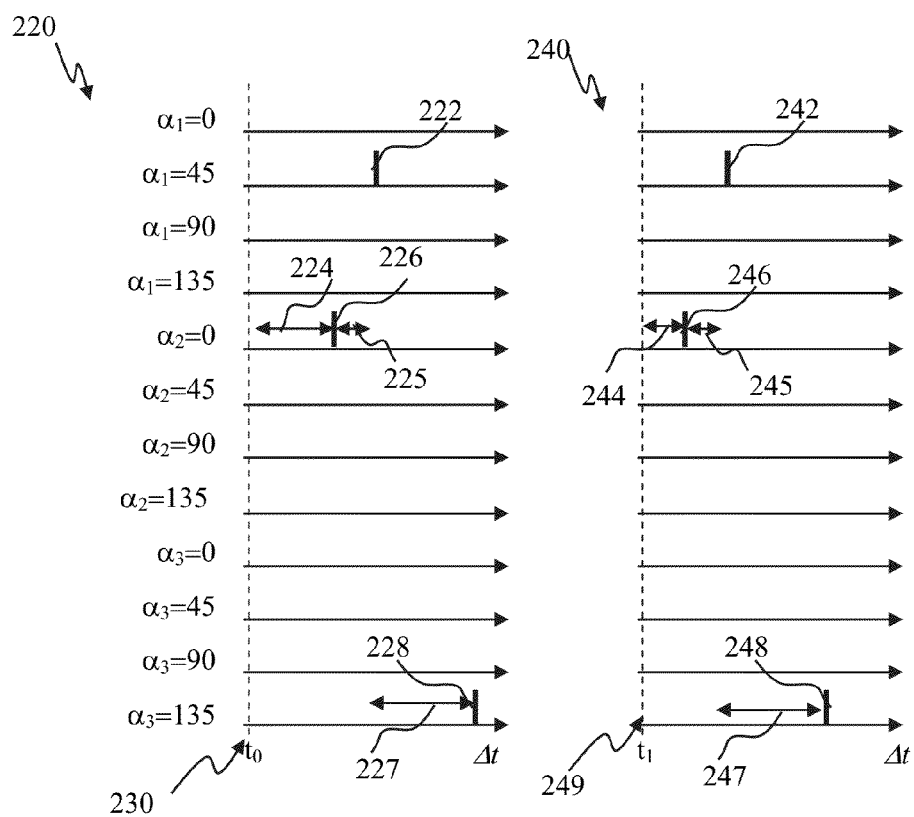
FIG. 2C is a block diagram illustrating invariant latency encoding of optical flow, in accordance with one or more implementations.
Figure 2D:
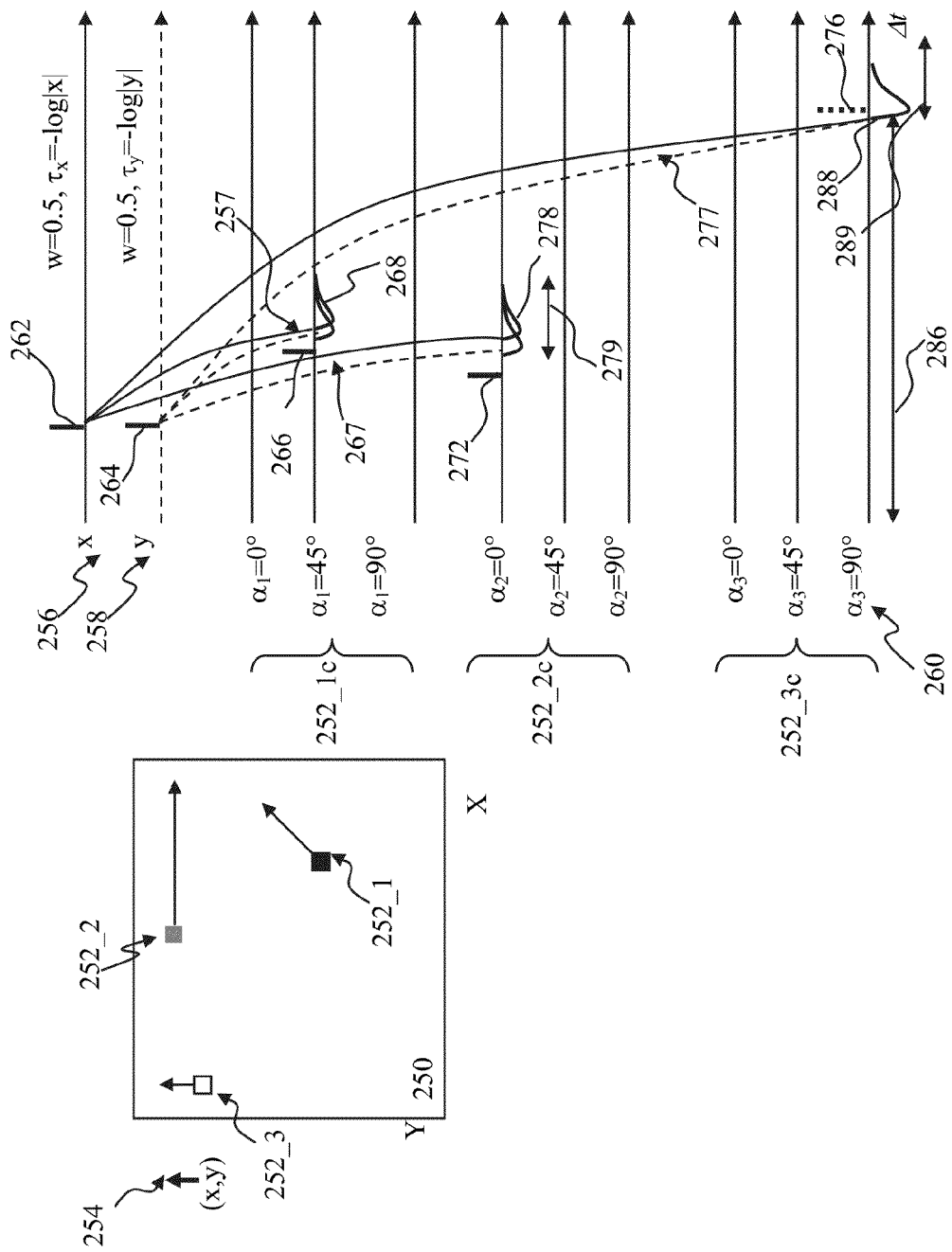
FIG. 2D is a diagram illustrating encoding of optical flow of FIG. 2B into latency using reference signals, in accordance with one or more implementations.

FIGS. 2B-2D illustrate invariant encoding of optical flow in to spike latency in accordance with one or more implementations. Panels 200, 210 of FIG. 2B present exemplary optical flows at time instances t0, t1, respectively. The optical flow field shown in frames 200, 210 may comprise one or more features 202, 212 having optic flow associated therewith, as indicated by straight arrows in FIG. 2B. The features 202_1, 212_1, 202_2, 212_2, 202_3, 212_3, may be characterized by the same optical flow direction, as depicted by the straight arrows of the same orientation. The magnitude optical flow of features 212 may be greater compared to the optical flow magnitude of features 202, as indicated by longer arrows in the panel 210.

Optical flow of FIG. 2B may be encoded into latency in accordance with, for example, Eqn. 3, using a spiking neuron network. Different locations within the frames 200, 210 may be encoded using different neuron groups. In one or more implementations, the frames 200, 210 may be partitioned into segments of pixels so that individual pixels within the same segment are encoded by the same group of neurons. Individual neurons within the neuron group (e.g., the group encoding a particular location) may be used to encode optical flow of different directions. In other words, receptive fields of individual neurons within individual neuron groups may be configured to be orientation specific, as illustrated in FIG. 12, described above.

Returning now to FIG. 2C, which presents latency encoding diagrams, where panel 220 may correspond to optical flow data of the panel 200 while panel 240 may correspond to optical flow data of the panel 210. Individual rows denoted $\alpha_i$ (i=1, 2, 3) may correspond to the respective locations (i.e., the features 202_1, 202_2, 202_3) within the frames 200, 210, and the numbers 0, 45, 90, 135 may denote neuron receptive field axis orientation (e.g., the arrows 302, 304 in FIG. 3).

As shown in FIG. 2C, neurons corresponding to (i) location 1 and orientation 45° ($\alpha_1$=45), (ii) location 2 and orientation 0° ($\alpha_2$=0), and (iii) location 3 and orientation 90° ($\alpha_3$=90) may respond with spikes 222, 226, 228, respectively, to the optical flow of the panel 200, and/or with spikes 242, 246, 248, respectively, to the optical flow of the panel 210.

Latency of the spikes 222, 226, 228, 242, 246, 248 may be configured using Eqn. 3. In some implementations, the latency of the spikes 222, 226, 228 may be referenced relative the onset time t0 of the frame 200, denoted by the arrow 230 in FIG. 2C, while latency of the spikes 242, 246, 248 may be referenced to the onset time t1 of the frame 210, denoted by the arrow 249 in FIG. 2C. Comparison of the spike latency timing of the panel 240 vs. the spike latency timing of the panel 220 illustrates invariance of the latency encoding with respect to optical flow magnitude. In particular, latency difference between spikes 222, 226 and 242, 246 may be the same. As is described with respect to FIG. 4 below, this may cause the same spike delay at 227, 247.

As shown in FIG. 2B by longer arrows in the panel 210, the magnitude optical flow of features 212 may be greater compared to the optical flow magnitude of features 202. In accordance with Eqn. 3, the latency of spikes 242, 246, 248 may be smaller compared to latency of the spikes 222, 226, 228. At the same time, the relative latency between spikes within the spike group of the panels 220, 240 may remain unchanged. That is, the latency difference 225 may be the same as the latency difference 245, and the latency difference 227 may be the same (e.g., invariant) as the latency difference 247. Herein, the term "group latency" is used to describe a common component of latencies within a group of spikes. In accordance, with Eqn. 3, the latency of spike group 242, 246, 248 may be shifted by the same amount compared to the spike group 222, 226, 228, so that the group latency 244 is smaller than the group latency 224. In one or more implementations, such as shown in FIG. 2C, the group latency may be described as the latency of the first spike within the group relative the onset of the input stimulus (e.g., the time 230 of the panel 220).

In one or more implementations, optical flow encoding into spikes may be aided by one or more motion channels as illustrated in FIG. 2D. The frame 250 may represent an optical flow field. Such an optical field may be obtained using, for example, processing of video output of the camera 106 from a moving platform (e.g., the rover 100 of FIG. 1). The motion of the rover may be described as a combination of an x-component and a y-component, depicted by the arrow 254 in FIG. 2D. In some implementations, x-component may comprise a rotational motion, and y-component may comprise a translational motion. The optical flow field in the frame 250 may be represented by pixel areas 252 whose motion is denoted by the straight arrows.

The channels 256, 258 in FIG. 2D may depict activity of motion encoding block (e.g., the output 168 of the block 158 in FIG. 1B). The spike 262 on the channel 256 may describe output due to x-component of the motion vector 254. The spike 264 of the channel 258 may describe output due to y-component of the motion vector 254. In one or more implementations, the motion denoted by the vector 254 may comprise multi-dimensional motion. Multi-dimensional motion may include a one-dimensional translational motion and a one-dimensional rotational motion. In some implementations the motion may comprise roll, pitch, and/or yaw components.

In some implementations, the multi-dimensional motion may include a multi-dimensional translational motion and/or a multi-dimensional rotational motion. When the motion encoder comprises more than one motion encoding channels (e.g., to support multi-dimensional motion) the encoder channel corresponding to the platform displacement of the appropriate type of motion may respond with a spike output. By way of a non-limiting example, a robotic device may comprise a pair of steering front wheels. Such a robotic device may be able to move in a single linear direction (e.g., fore and aft) and a single rotational dimension (e.g., around the vertical axis).

The channels 260 in FIG. 2D may depict activity of the optical flow encoding block (e.g., the output 162 of the block 152 in FIG. 1B). The notation used in describing the optical flow output in FIG. 2D is the same as the notation in FIG. 2C described above. Specifically, the spike 266 on the channel $\alpha_1 = 45°$ of encoder block 252_1c may represent optical flow of the pixel area 252_1 in the frame 250 which is at 45° direction, the spike 272 on the channel $\alpha_2 = 0°$ of encoder block 252_2c may represent optical flow of the pixel area 252_2 in the panel 250 which is at 0° direction, and the channel $\alpha_3 = 90°$ of encoder block 252_3c may represent optical flow of the pixel area 252_3 in the frame 250 which is at 90° direction. Hereinafter we use the term encoder block to describe a set of spike channels that may relate to possible outputs of an optical flow (e.g. the output 162 of block 154 in FIG. 1B, as a non-limiting example).

The solid and the broken curves associated with the spikes 262, 264, respectively, and denoted 257, 267, 277 in FIG. 2D may denote inhibitory connections (e.g., the connections 182, 184 of FIG. 1C) from the motion encoder to the optical flow encoder neurons. In one or more implementations, the connections 257, 267, 277 may be characterized by the corresponding spike transmission/propagation delays Δt (257,267, 277 in FIG. 2D). The delays may be configured to match the specific hardware configuration of the visual data acquisition platform. In some implementations, the delays Δt for translational and/or rotational motion connections may be determined by a calibration process. An exemplary calibration process may comprise (1) subjecting the visual acquisition system (e.g., the camera and the robot) to a translational motion with a fixed non-negligible rotational motion, (2) encoding the motion into spike output (e.g., the spike 262 in FIG. 2D), (3) detecting the timing of spike 262 arrival to individual optical flow encoding neurons (e.g., 260 in FIG. 2D), and/or one or more other operations. In some implementations, the fixed non-negligible rotational motion may comprise to motion value in the middle of the rotational motion range and/or another value that may be appropriate for calibration apparatus. The translational motion may be varied across useful range of translational motions so that delays may be determined for individual values of the translational motion.

An exemplary calibration process may further comprise (1) subjecting the visual acquisition system (e.g., the camera and the robot) to a rotational motion accompanied by fixed non-negligible translation motion, (2) encoding the rotational motion into spike output (e.g., the spike 264 in FIG. 2D), (3) detecting the timing of spike 264 arrival to individual optical flow encoding neurons (e.g., 260 in FIG. 2D), and/or one or more other operations. In some implementations, the fixed non-negligible translational motion may comprise to motion value in the middle of the translational motion range and/or another value that may be appropriate for calibration apparatus. The rotational motion may be varied across useful range of rotational motions so that delays may be determined for individual values of the rotational motion.

In one or more implementations, when the inhibitory connection(s) 262 and/or 264 deliver inhibitory spike(s) to the one or more optical flow encoding neurons 260, the neuron excitability may be reduced as indicated by curves 268, 278, 288 in FIG. 2D. Such an effect may be referred to as the inhibitory post-synaptic potential (IPSP).

In one or more implementations, when the inhibitory connection(s) 262 and/or 264 deliver inhibitory spike(s) to the one or more optical flow encoding neurons 260, the neuron inhibitory trace may be incremented (not shown).

The IPSP and/or inhibitory trace may be configured to decay with time as indicated by the curves 268, 278, 288 in FIG. 2D and described in detail in the co-owned and co-pending U.S. patent application Ser. No. 13/660,923, entitled "ADAPTIVE PLASTICITY APPARATUS AND METHODS FOR SPIKING NEURON NETWORK", filed Oct. 25, 2012, incorporated supra, and co-owned U.S. patent application Ser. No. 13/488,106, filed on Jun. 4, 2012, entitled "SPIKING NEURON NETWORK APPARATUS AND METHODS", issued as U.S. Pat. No. 9,098,811 on Aug. 4, 2015, incorporated herein by reference in its entirety.

The inhibitory signal (e.g., spikes 262, 264) provided by the motion encoder 256, 258 may be utilized to cancel optical flow due to self-motion of the sensor platform (e.g., the robot 100 and/or camera 106 in FIG. 1A).

By way of a non-limiting example, the optical flow map 250 may comprise the flow component 252_3 induced by the self-motion 254 due to common, stationary objects in a scene, and may include a reflection from a floor, a wall, and/or another stationary object. Accordingly, arrival time 286 of the spike 262 (and/or spike 264) at the neuron 260 configured to encode optical flow signal at $\alpha_3 = 90°$ may coincide with the response generation time (shown by broken line 276 in FIG. 2D) by the $\alpha_3 = 90°$ neuron. In some implementations, the self-calibration delays Δt described above may be configured to cause the self-motion signal to slightly precede the spike generation, as shown by the curve 288 relative the spike generation time 276 in FIG. 2D. In one or more implementations, the self-motion spike(s) 262, 264 may arrive within a time window prior to response generation by the neuron. The self-motion spike(s) 262, 264 may cause an inhibitory PSP within a time window (e.g., the interval 289 in FIG. 2D). The width and/or position of the window 289 may be configured based on optical flow encoder angular resolution and/or the expected noise in the optical flow measurements. In some implementations, angular resolution may be characterized by angle difference distance between individual channels within the group 252_2c. In one or more implementations, the duration of the inhibitory window may be configured between 0.01 ms and 10 ms.

It will be appreciated by those skilled in the arts that the above inhibitory window durations are provided to illustrate one or more implementations of the disclosure and the inhibitory window duration (e.g., the spike cancellation range 279, 289) may be configured based on specific requirements of application, such as latency tolerance. Latency tolerance may be used to describe maximum time difference between occurrence of the two (or more) motion spikes and the timing of the optical flow encoder neuron response (e.g., the spikes 262, 264, abd the spike 276). In some implementations, the latency tolerance may be used to determine the minimum optical flow angular resolution. In some implementations, the OF angular resolution may be configured such that the maximum built-in overlap (which may occur in the middle of the angular range) is significantly smaller than the latency tolerance. If that holds, the desired tolerance may be determined by the IPSP width, and may be enforced in calibration by determining the width of the potentiation region of the STDP rule.

The optical flow components 252_1, 252_2 may represent object motion, at 0° and 45°, respectively, as shown in the panel 250 of FIG. 2D. Based on the optical flow input 252_1, the neuron $\alpha_1=45°$ of the neuron group configured to process the location 1 may generate response spike 266 in the channel group 252_1c. The optical flow 252_1 may comprise an object motion component (in addition to the self-motion component), the self-motion spike(s) 262, 264 may not precede (and/or coincide with) the response spike 266, as illustrated by the IPSP 268. As a result, the response generation preceding spike 266 may not be inhibited by the self-motion mechanism and response spike 266 may be output.

Based on the optical flow input 252_2, the neuron $\alpha_2=0°$ of the channel group 252_2c configured to process the location 2 may generate response spike 272 in the channel group 252_2c. The optical flow 252_2 may comprise object motion component (in addition to the self-motion component). The self-motion spike(s) 262, 264 may not precede (and/or coincide with) the response spike 272, as illustrated by the IPSP 278. As a result, the response preceding the spike 276 may not be inhibited by the self-motion mechanism and the response spike 276 may be output.

The implementation illustrated in FIG. 2D comprises groups of neurons. The groups of neurons may be configured to encode optical flow at individual locations with resolution of 45°. In some implementations, the resolution may be improved by increasing the number of neurons within each location-specific neuron group. In one or more implementations, the encoder angular resolution may be improved by using two (or more) encoder banks, as illustrated in FIG. 3.

Figure 4:
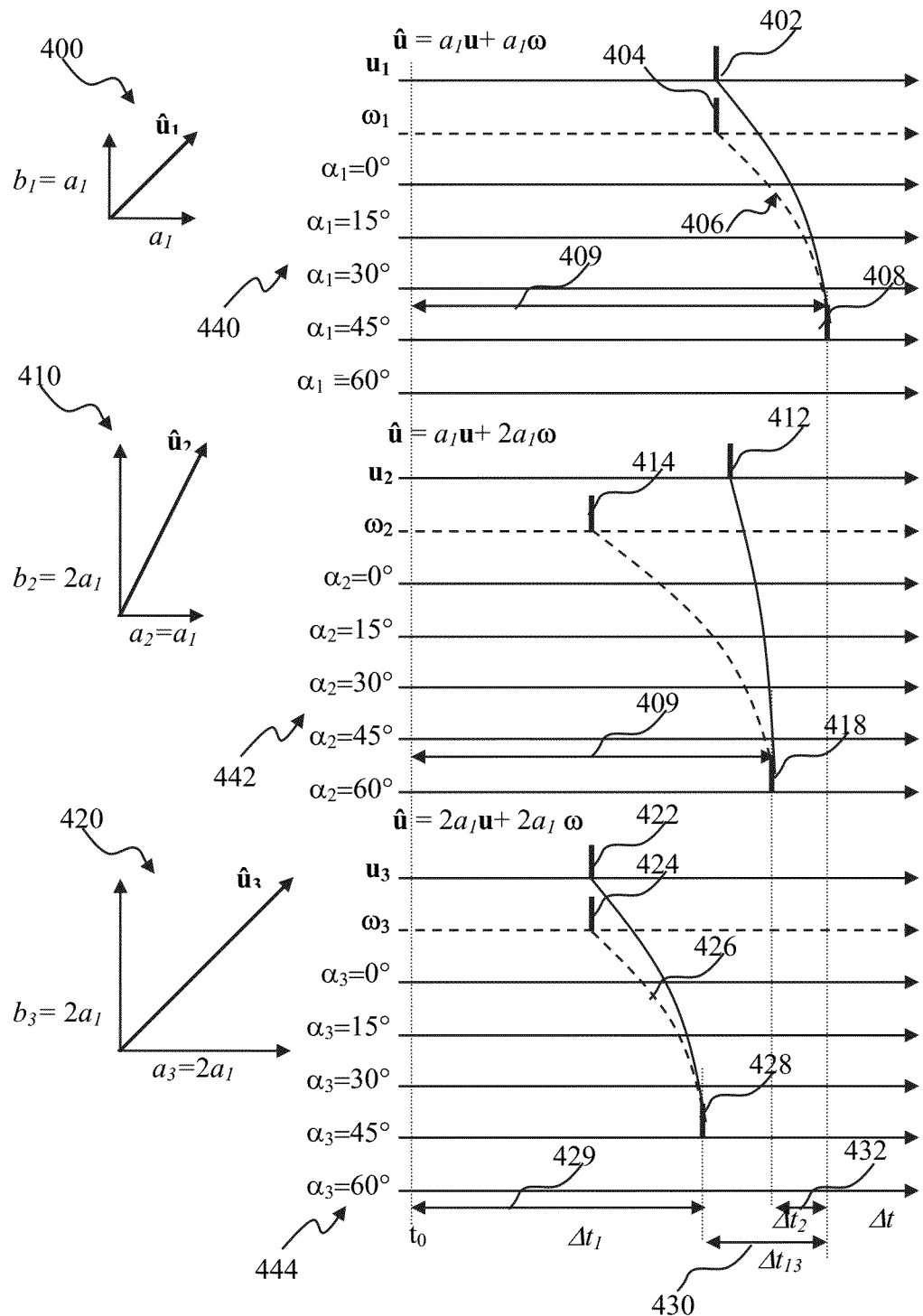
FIG. 4 is a lag diagram illustrating encoding of optical flow into latency, in accordance with one or more implementations.

FIG. 4 illustrates invariant properties of self-motion and/or optical flow encoding, in accordance with one or more implementations. The optical flow vector v due to platform motion may comprise a vector sum of optical flow vector û due to translational motion u and optical flow vector ω̂ rotational motion ω:

$$v = \hat{u} + \hat{\omega}. \quad \text{(Eqn. 8)}$$

The panels 400, 410, 420 in FIG. 4 may depict timing diagrams for encoding of the following motions, respectively:
(i) optical flows due to translational u and rotational ω motions of the same magnitude $a_1$: $v=a_1+a_1\omega$;
(ii) rotational motion ω that is twice the magnitude of the translational motion u magnitude: $v=a_1+2a_1\omega$; and
(iii) translational and rotational motions u, ω of the same magnitude $2a_1$ that is twice the magnitude of the motion in the panel 400: $v=2a_1u+2a_1\omega$.

The panels 440, 442, 444 display activity of the encoder blocks configured to encode optical flow obtained as a result of self-motion of the panels 400, 410, 420, respectively, and in the absence of other (e.g., object) motion. Because the self-motion magnitude in panel 420 may be twice the magnitude of the self-motion in panel 400, latency of the spikes 422, 424 encoding the self-motion of the panel 420 may be shifted by a factor of log(2) ahead in time compared to latency of the spikes 402, 404 encoding the self-motion of panel 400, in accordance with Eqn. 4-Eqn. 5.

Contrast the response of the self-motion encoder in the panel 410. While the spike 412 may have the same latency as the spike 402 (the u component of the self-motion in the panels 400, 410 is the same), latency of the 414 spike may be shifted by a factor log(2) ahead of spike 404 latency. In other words, the pulse pattern 402, 404 may be invariant to the magnitude of the motion û but not the direction.

As the optical flow due to self-motion (u,ω) may be of the same magnitude in the panels 440, 444, the resulting motion û may be oriented at 45°. The optical flow encoding neurons $\alpha_1=45°$, $\alpha_3=45°$ may generate responses 408, 428, respectively, associated with the self-motion. As illustrated in FIG. 4, latency of the spikes 408 may be smaller compared to latency of the spikes 428.

In the panel 410, the optical flow due to self-motion is oriented at 60°. The neuron $\alpha_2=60°$ may generate the response 418 with the latency that is in-between the latencies 428 and 408.

In one or more implementations, the velocity resolution of the self-motion (and/or optical flow) encoding (e.g., the encoder blocks 154, 158 in FIG. 1B, and/or the neuron encoding banks 256, 258, 260 in FIG. 2D) may be determined based on (i) input refresh interval $\Delta t_{refresh}$; (ii) optical flow range; and (ii) encoder update interval $T_{update}$ as follows:

$$\log(\Delta v) = \log\left|\frac{v_{max}}{v_{min}}\right|\frac{\Delta t_{refresh}}{T_{update}}, \quad \text{(Eqn. 9)}$$

where $v_{max}$ is a maximum expected optical flow magnitude, and $v_{min}$ is the smallest expected optical flow magnitude, and $\Delta v$ optical flow resolution.

In some implementations, the input refresh interval $\Delta t_{refresh}$ fresh may be configured with equal inter-frame intervals (e.g., 40 ms) corresponding to a video refresh rate of 25 frames per second (fps). In one or more implementations, the network update rate may be configured at 1 ms intervals producing encoding resolution of 40 steps.

In some implementations, self-motion u and/or ω spikes (e.g., the spikes 402, 404 in FIG. 4) may be generated prior to optical flow spikes (e.g., 408, 418 in FIG. 4) so that the inhibition mechanism (e.g., IPSP 268, 278) may be utilized.

Figure 5A:
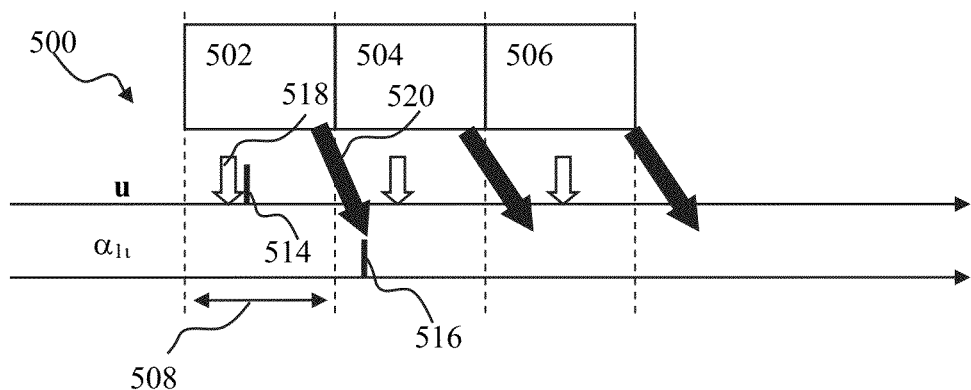
FIG. 5A is a block diagram illustrating delayed optical flow encoding, in accordance with one or more implementations.

In one or more implementations, such as illustrated in FIG. 5A, encoding of the optical flow (e.g., the output spikes 408, 418 in FIG. 4) may be delayed by a motion encoding interval. In FIG. 5A, the input optical flow may comprise one or more frames 502, 504, 506. Individual optical flow frames 502, 504, 506 may be accompanied by self-motion information illustrated by open arrows, e.g., the arrow 518. The self-motion input may be encoded upon receipt of the motion self-motion data 518 to produce encoded motion spike 514 in FIG. 5A. The optical flow encoding may be delayed until a full motion encoding time interval has elapsed. In one or more implementations, such as shown in FIG. 5A, the full motion encoding window interval may comprise the optical flow inter-frame interval. That is, while the self-motion for the frame 502 is encoded within the time interval associated with the frame 502, the optical flow, denoted by the filled arrows, e.g. arrow 520, of the frame 502 may be encoded during the time interval of the subsequent frame (e.g., 504 in FIG. 5A). The implementation shown in FIG. 5A may enable the motion spike(s) 514 to precede the optical flow spike(s) 516 for the maximum range of self-motion. In one or more implementations (not shown), the motion encoding time interval may be configured to be greater than inter-frame interval, e.g., 508 in FIG. 5A. In one or more implementations (not shown), the motion encoding time interval may be configured to be shorter than the inter-frame interval.

Figure 5B:
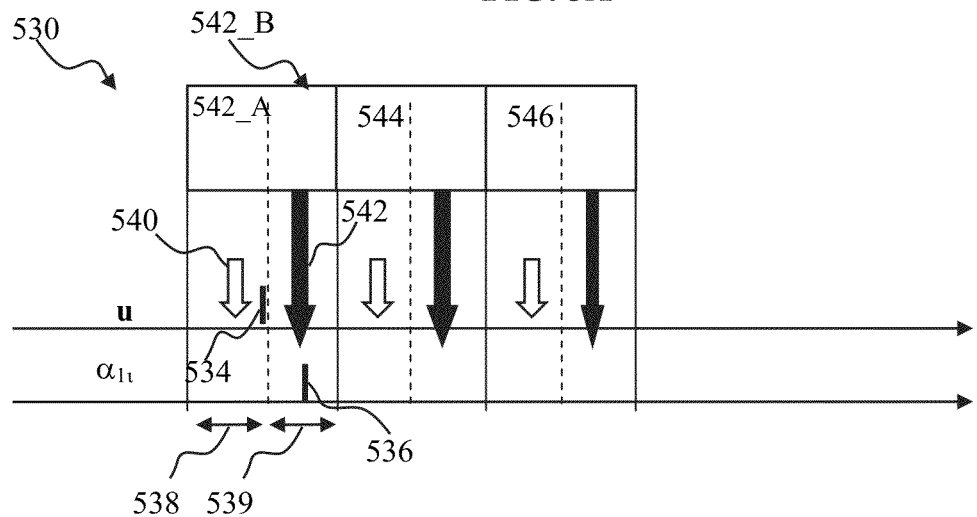
FIG. 5B is a block diagram illustrating split-frame motion and optical flow encoding, in accordance with one or more implementations.

In one or more implementations, such as illustrated in FIG. 5B, the time interval associated with the input optical flow frames 542, 544, 546 may be divided in two or more parts. One part (e.g., the time window 542_A in FIG. 5B having width 538) may be used to encode self-motion 540 to produce, for example, motion spike output 534. Another part (e.g., the time window 542_B in FIG. 5B having width 539) may be used to encode optical flow 542 to produce, for example, flow spike output 536.

The approach of FIG. 5A may maintain flow resolution. The approach of FIG. 5A may introduce a delay. The approach of FIG. 5B may not introduce delays. The approach of FIG. 5B may be characterized by a lower resolution for the same network refresh rate. A choice between the two approaches may depend on the specific design requirements. Examples of such specific design requirements may include one or more of motion acquisition rate, optical flow acquisition rate, network update rate, self-motion range, an anticipated object motion range, and/or other parameters.

FIGS. 6A-9B illustrate methods of self-motion cancellation for optical flow encoding using spiking neuron networks in accordance with one or more implementations. The operations of methods FIGS. 6A-9B described below are intended to be illustrative. In some implementations, methods 600, 620, 700, 800, 820, 900, and/or 920 may be accomplished with one or more additional operations not described, and/or without one or more of the operations discussed. Additionally, the order in which the operations of methods are illustrated in FIGS. 6A-9B and described below is not intended to be limiting.

In one or more implementations, methods 600, 620, 700, 800, 820, 900, and/or 920 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 600, 620, 700, 800, 820, 900, and/or 920 in response to instructions stored electronically on an electronic storage medium. The one or more processing devices may include one or more devices configured through hardware, firmware, and/or software to be specifically designed for execution of one or more of the operations of methods 600, 620, 700, 800, 820, 900, and/or 920.

Figure 6A:
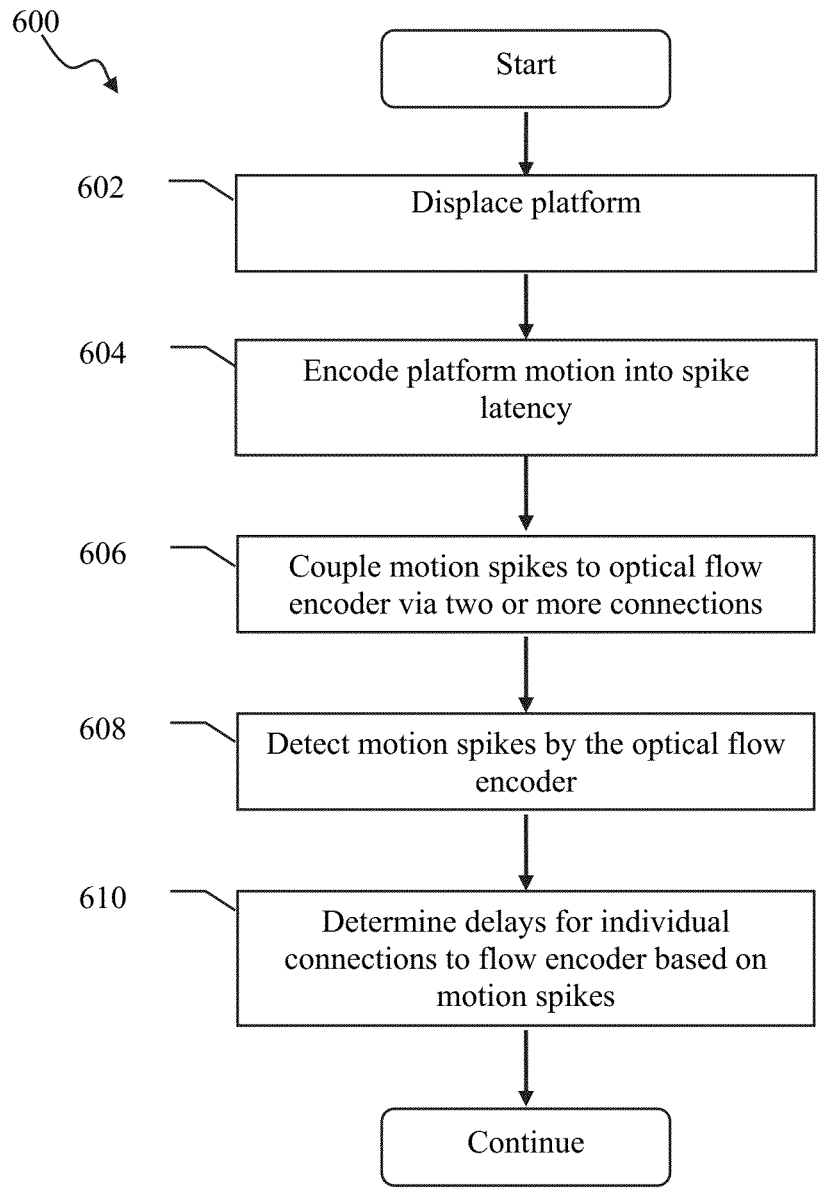
FIG. 6A is a logical flow diagram illustrating single component self-motion encoder calibration for use with an optical flow encoder network (see, e.g., FIG. 1C), in accordance with one or more implementations.

Referring now to FIG. 6A, one exemplary implementation of optical flow encoder calibration method for a single motion component for use with, for example, the encoder 170 of FIG. 1C and/or a robotic device 100 of FIG. 1, is described in detail. In one or more implementations, the calibration of method 600 may be performed in an environment that may comprise one or more boundaries (e.g., floor, walls). The environment may not include stationary objects (e.g., pillars) that, by way of a non-limiting example, may impede operation of the robotic platform and/or trigger obstacle avoidance algorithms.

At step 602 of method 600, motion may be induced to the robotic platform. In some implementations, the motion may comprise a linear displacement (e.g., forward or backward) of the platform. In one or more implementations, the motion may comprise an angular rotation (e.g., clockwise or anti-clockwise) of the platform and/or other motion component.

At step 604, the motion information may be provided (for example by an inertial motion unit) to motion encoder. The motion encoder (e.g., the block 158 in FIG. 1C) may be encoded into one or more motion spikes. In some implementations, the encoding may be effectuated based on latency encoding of Eqn. 4 or Eqn. 5. By way of non-limiting example, a robotic device may comprise a pair of steering front wheels. Such a device may be able to move in a single linear direction (e.g., fore and aft). The calibration process may be configured as follows When the calibration motion of the step 602 comprises fore/aft translational motion, the translational channel of the encoder (e.g., the neuron 172 in FIG. 1C) may be active (e.g., generate output).

At step 606, the output of the motion encoder may be provided to the optical flow encoder (e.g., the encoder 160 of FIG. 1B, and/or neurons 176 of FIG. 1C) via one or more connections. Individual connections (e.g., the connections 182, 184 in FIG. 1C) may be characterized by connection delay $\Delta t_i$. In one or more implementations, during calibration the connections (e.g., 182, 184) may be configured as excitatory connections so that their efficacy 178 may cause excitatory post-synaptic potential (EPSP) on neurons 176 in FIG. 1C.

At step 608, motion spikes may be detected by the optical flow encoder neurons. In one or more implementations, spike detection may be effectuated using spike time dependent plasticity (STDP) mechanism. By way of a non-limiting illustration, during calibration, excitatory connections may be potentiated based on arrival of a spike with appropriate delays from motion encoding neuron (e.g., 172, 174 in FIG. 1C) to individual ones of the optical flow encoding neurons (e.g., 176 in FIG. 1C).). The Excitatory connections may be depressed based on arrival of a spike with inappropriate delays from the motion encoding neuron (e.g., 172, 174 in FIG. 1C) to individual ones of the optical flow encoding neurons (e.g., 176 in FIG. 1C).

At step 610, delay associated with the motion spike detection by the optical flow encoder neurons may be determined. In one or more implementations, the delay may be based on a difference between the spike detection time of step 608 and the platform motion time of step 602. In some implementations, the delay determined at step 610 may be used to characterized data communication properties of individual connections (e.g., the connections 182, 184 in FIG. 1C) coupling the motion encoder to the optical flow encoder.

Figure 6B:
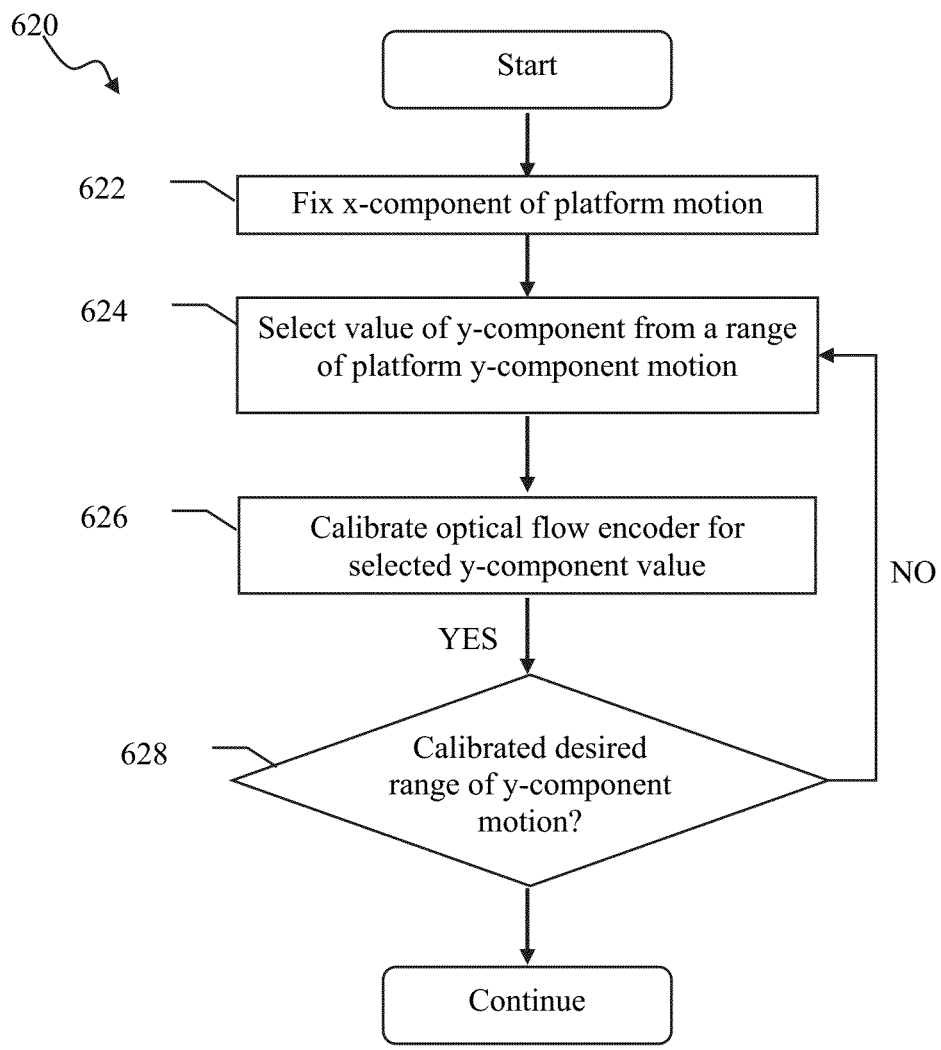
FIG. 6B is a logical flow diagram illustrating multiple-component self-motion encoder calibration for use with an encoder network (see, e.g., FIG. 1C), in accordance with one or more implementations.

FIG. 6B, illustrates exemplary implementation of optical flow encoder calibration method for a multi-component motion for use with, for example, the encoder 170 of FIG. 1C and/or a robotic device 100 of FIG. 1, in accordance with one or more implementations. In one or more implementations, the calibration of method 620 of FIG. 6B may be performed in an environment that may comprise one or more boundaries (e.g., floor, walls). The environment may not include stationary objects (e.g., pillars) that, by way of a non-limiting example, may impede operation of the robotic platform and/or trigger obstacle avoidance algorithms.

At step 622 of method 620, a motion component of the robotic platform (e.g., x-component) may be configured at a fixed non-trivial (e.g., non-zero) value. In some implementations, the x-component may comprise a linear displacement (e.g., forward or backward) of the platform. In one or more implementations, the x-component motion may comprise an angular rotation (e.g., clockwise or anticlockwise) of the platform and/or other motion component. In some implementations of multi-component (x,y) motion encoder calibration, the component x may be selected constant at a value in the middle of the x-motion range. In one or more implementations of n-component motion (n>2) individual motion combinations may be calibrate by utilizing latency invariance in order to remove connection lag dependence on a single motion component at a time.

At step, 624, a value of y-component may be selected. In one or more implementations, the y component may be varied (swept) through the range of y motion values (e.g., from largest to smallest, and/or smallest to ranges, and/or in another manner). In some implementations, the y-component may comprise a linear displacement (e.g., forward or backward) of the platform. In one or more implementations, the y-component motion may comprise an angular rotation (e.g., clockwise or anticlockwise) of the platform and/or other motion component.

At step 626, for a chosen pair of x-y values, the motion encoder to optical flow encoder connection delays may be calibrated using, for example, methodology of method 600 described above with respect to FIG. 6A.

At step 628, a determination may be made if the target range of y-motion has been calibrated. If the encoder needs to be calibrated for additional values of y-component, the method may proceed to step 622.

Figure 7:
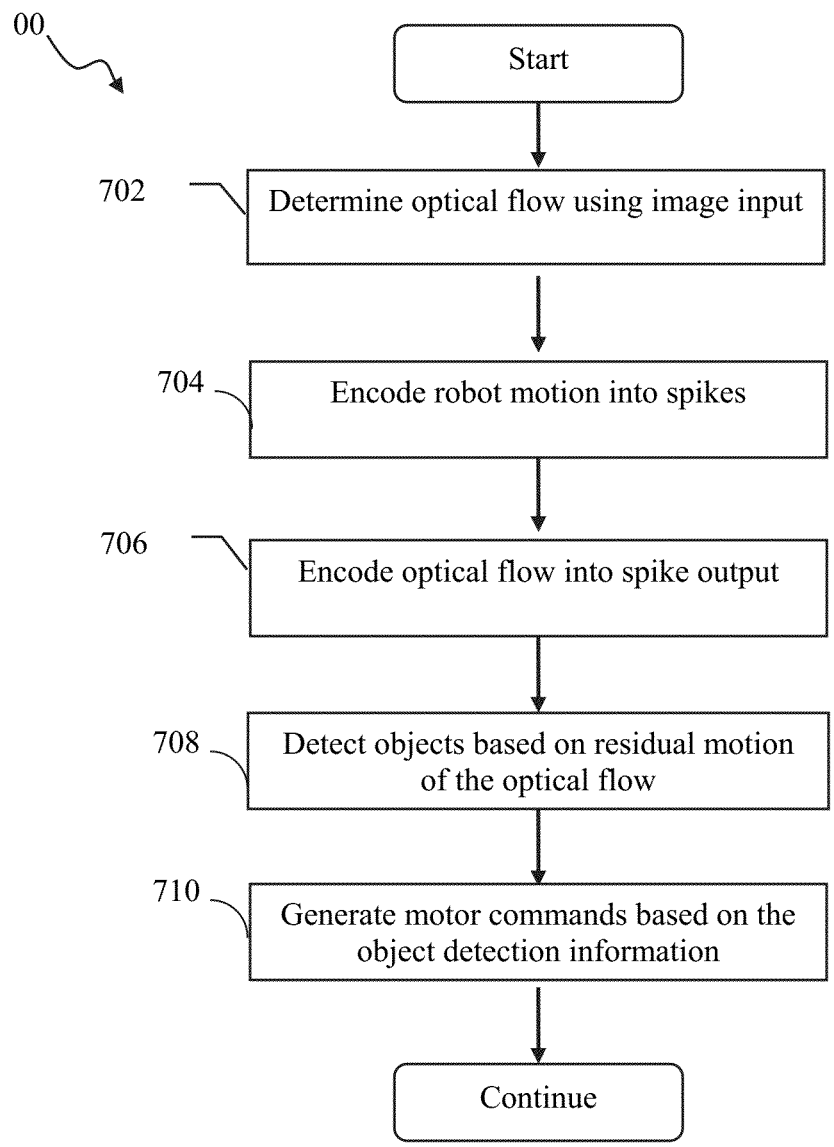
FIG. 7 is a logical flow diagram illustrating robotic device controller operation comprising optical flow encoding, in accordance with one or more implementations.

FIG. 7 illustrates operation of a robotic device comprising the optical flow object detection apparatus configured in accordance with one or more implementations. In some implementations, the method 700 of FIG. 7 may be utilized by obstacle avoidance controller apparatus of a robotic device 100 of FIG. 1A.

At step 702 of method 700, optical flow may be determined. In one or more implementations, the optical flow determination may be based on a differential processing of image luminosity frames (e.g., the frames 280, 285) described above with respect to FIG. 2A, and/or by a specialized camera.

At step 704, information describing the self-motion of the robotic device may be encoded into spike latency. In some implementations, the encoding may be effectuated based on latency encoding of Eqn. 4 or Eqn. 5. In one or more implementations, the self-motion may be composed of multiple motion components (e.g. translational and/or rotational components).

At step 706, optical flow determined at step 702 may be encoded. The optical flow may be encoded by, for example, spiking neuron 176 of FIG. 1C. In some implementations, optical flow associated with one or more portions of the optical flow field (e.g., the portions 202_1, 202_2, 202_3 of FIG. 2B) may be encoded by one or more individual encoder banks (e.g., group of neurons $\alpha_i$ in FIG. 2C). In one or more implementations, individual neurons within individual encoder banks (e.g., the neurons 176 in FIG. 1C) may be configured to respond to optical flow component within a pre-determined range of directions. In some implementations, the receptive field of the optical flow encoder neurons may be configured in accordance with implementations, illustrated in FIG. 12.

Optical flow encoding may be aided by the encoded motion spiking signal coupled to the flow encoding neurons via one or more connections (e.g. the connections 182, 184 in FIG. 1C). In some implementations, the connections may be configured in accordance with one or more delays. The one or more delays may be determined, for example, using method 600 of FIG. 6A. In some implementations, spike output of the encoded motion may cause an inhibitory effect on the dynamic state of the optical flow encoder neurons. An inhibitory post-synaptic potential may decrease neuron excitability. In some implementations, the excitability decrease may be characterized by a decay interval (e.g., the interval 279 in FIG. 2D), covering the expected latency variability due to measurement noise.

At step 708, one or more objects may be detected. The one or more detected objects may comprise one or more moving objects and/or one or more stationary objects. In some implementations, object detection may be facilitated by analysis of the residual encoded optical flow. In one or more implementations, the residual flow may be generated via the inhibition-based cancellation of optical flow by induced self-motion.

At step 710 one or motor commands may be generated. In one or more implementations, the motor commands may be based on the one or more objects detected at step 708. In some implementations, the motion commands may comprise one or more of a speed decrease, a speed increase, an evasive action command, a command facilitating obstacle avoidance, and/or other commands.

Figure 8A:
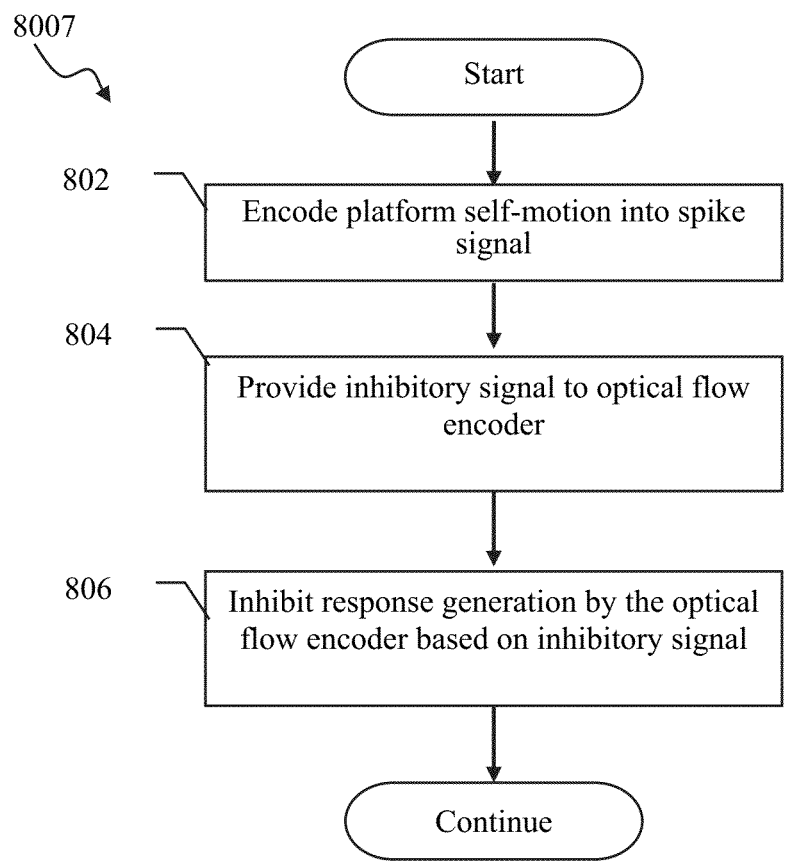
FIG. 8A is a logical flow diagram illustrating optical flow encoder inhibition based on self-motion encoder output, in accordance with one or more implementations.

FIG. 8A illustrates a method for performing platform self-motion cancellation in optical flow based on motion-induced inhibition of the optical flow encoder neurons, in accordance with one or more implementations.

At step 802 of method 800, motion of the platform may be encoded into spike output. In one or more implementations, the motion encoding may comprise latency encoding described above with respect to step 704 of method 700 above.

At step 804 am inhibitory indication may be provided to the optical flow encoder (e.g., the block 154 in FIG. 1B). In one or more implementations, the inhibitory indication may comprise one or more spiking signals delivered via one or more connections. In some implementations, the one or more connections may be characterized by inhibitory efficacy configured in accordance with, for example, Eqn. 6.

At step 806, the inhibitory indication may cause inhibition of response generation by one or more neurons of the optical flow encoder. In some implementations, the inhibitory indication may inhibit response generation by one or more neurons of the optical flow encoder, as illustrated, for example, by the neuron $\alpha_3=90°$ of the encoder bank 260 of FIG. 2D. In some implementations, the inhibition may be due to a contemporaneous or near-contemporaneous arrival of the inhibitory indication to the one or more neurons. In some implementations, the inhibition may be effectuated by the arrival of the inhibitory indication prior to the response generation by the neuron. In some implementations, the inhibitory indication may reduce excitability of the one or more neuron. The excitability of the neuron may remain in a sub-threshold state for a period of time thereby preventing response generation by the neuron during this time interval. The width and/or the timing of the inhibitory window may be configured based on optical flow encoder angular resolution and/or noise in the optical flow measurements. In one or more implementations, the inhibitory window width may be selected, for example, between 0.01 ms to 10 ms.

Figure 8B:
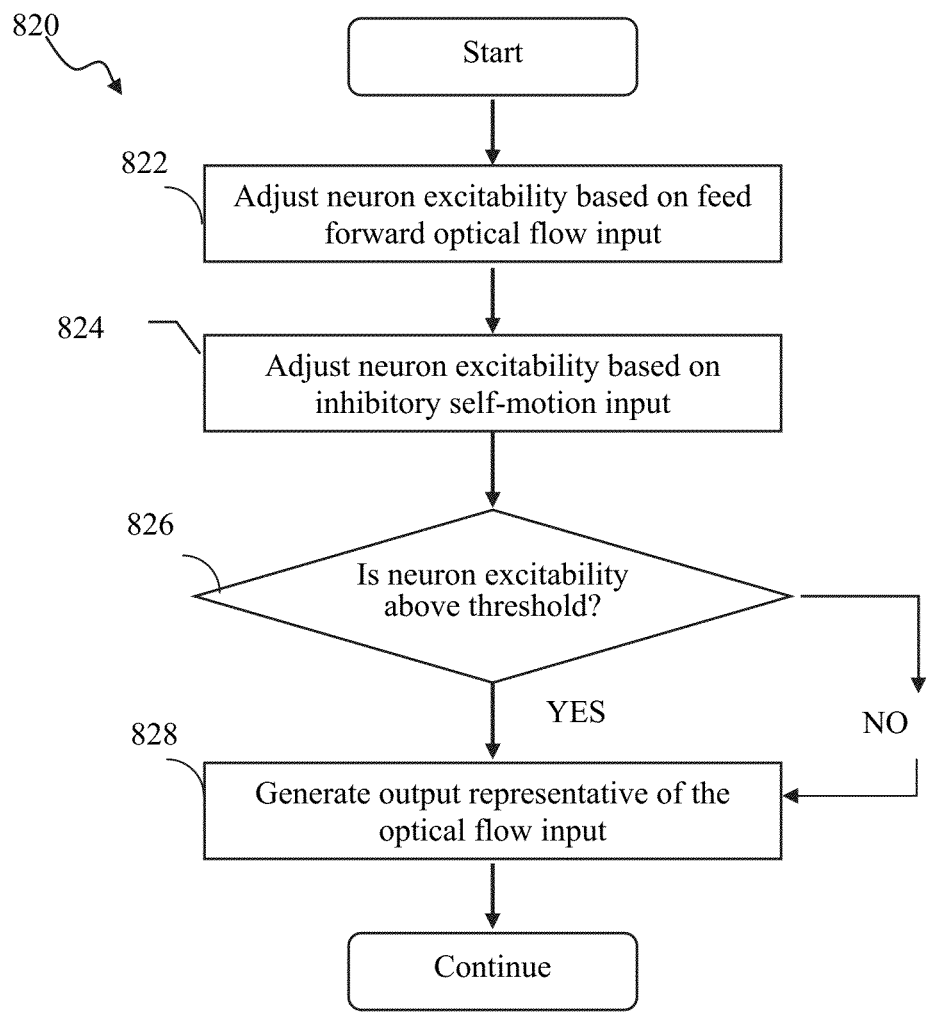
FIG. 8B is a logical flow diagram illustrating neuron operation of the optical flow encoder of FIG. 8A, in accordance with one or more implementations.

FIG. 8B illustrates a method of operating a spiking neuron of the optical flow encoder, in accordance with one or more implementations. The method 820 of FIG. 8B may be used in the optical flow encoder block 160 of FIG. 1B, optical flow encoder bank 260 of FIG. 2D and/or with the neurons 176 of FIG. 1C.

At step 822 of method 820, neuron excitability may be adjusted in accordance with feed-forward optical flow excitatory stimulus. In some implementations, the feed-forward optical flow excitatory stimulus may be provided, for example, via one or more connections 188 in FIG. 1C. The neuron may be configured to encode optical flow input of a certain orientation at a certain location, such as the neuron $\alpha_1 = 45°$ in FIG. 2D, configured to respond to optical flow at the location of the pixel block 202_1 with orientation of 45°.

At step 824 of method 820, neuron excitability may be adjusted in accordance with inhibitory input. The inhibitory input may be provided, for example, via the one or more connections 182, 184 in FIG. 1C. The inhibitory input may be due to one or more of the self-motion components encoded by the self-motion encoder neurons, such as the neurons 172, 174 in FIG. 1C. The inhibitory input may comprise time-decaying inhibitory post-synaptic potential, as depicted for example by the curves 278, 288 in FIG. 2D.

At step 826, neuron excitability may be compared to a neuron response generation threshold (e.g., a firing threshold). In some implementations, the threshold may comprise a static threshold. In some implementations, the threshold may be configured dynamically. Such a dynamically configured threshold may be the same as or similar to the one described in a co-owned U.S. patent application Ser. No. 13/623,820, filed Sep. 20, 2012, and entitled "APPARATUS AND METHODS FOR ENCODING OF SENSORY DATA USING ARTIFICIAL SPIKING NEURONS", issued as U.S. Pat. No. 9,047,568 on Jun. 2, 2015, which is incorporated herein by reference in its entirety.

When the neuron excitability is above the response threshold, the method 820 may proceed to step 828 where an output (e.g., a spike) may be generated by the neuron. The output spike may indicate the presence of optical flow of a certain direction at the location associated with the encoder neuron (e.g., 45° at location 202_1 in FIG. 2D). In some implementations, the latency of the output spike may be configured in accordance with the magnitude of the optical flow (e.g., Eqn. 3). In some implementations, the encoded optical flow may be communicated via one or more connections (e.g. 186 of FIG. 1C) to an object detection block for further processing.

Figure 9A:
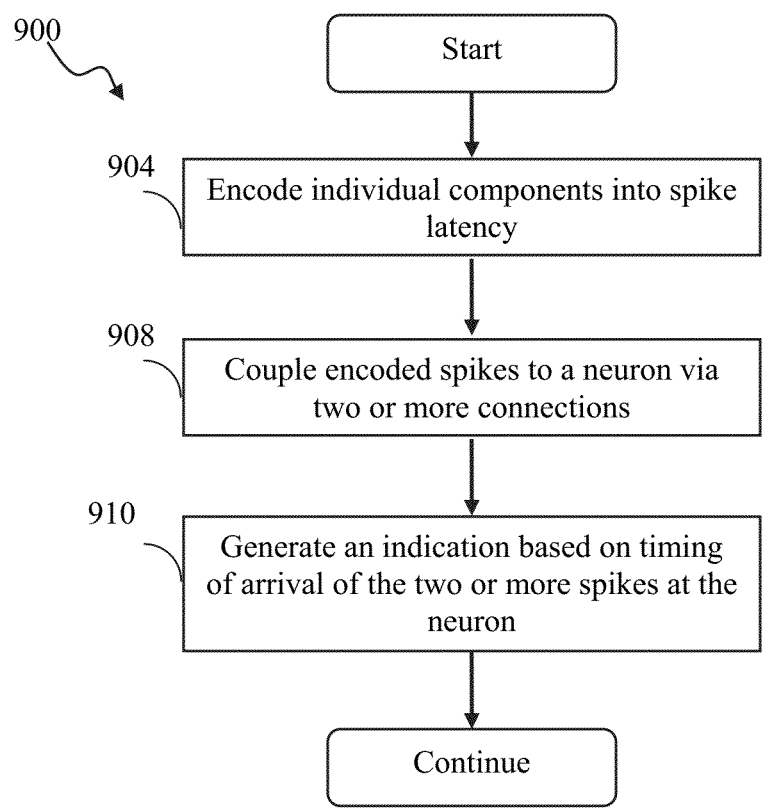
FIG. 9A is a logical flow diagram illustrating a generalized method of multicomponent vector encoding using pulse latency, in accordance with one or more implementations.

FIG. 9A illustrates a method of encoding a multicomponent parameter using spiking neurons. In some implementations, the multicomponent parameter may comprise a motion vector comprised of two or more motion components (e.g., a translational and a rotational motion).

At step 904 of method 900, individual components of the multicomponent parameter may be encoded into spike output. In one or more implementations, the encoding may comprise latency encoding. The latency encoding may use Eqn. 4-Eqn. 5, in accordance with some implementations.

At step 908, the encoded parameters (e.g., the spikes) may be coupled to one or more detector neurons via two or more connections (e.g., 182, 184 in FIG. 1C). In some implementations, the two or more connections may be characterized by inhibitory efficacy configured in accordance with, for example, Eqn. 6.

At step 910, an indication may be generated based on timing of arrival of the two or more spikes at a detector neuron (e.g., the neuron 176 in FIG. 1C). In one or more implementations, the indication may be based on a synchronous arrival of the two or more spikes at the detector neuron. In some implementations where the multi-component parameter comprises a vector, the indication may signify that parameter orientation associated with the detector matches the orientation of the multi-component vector. In some implementations, the synchronous arrival may be based on a time difference between the two or more spikes in the range between 0.01 ms and 10 ms. In some implementations, the synchronous arrival may be determined by using a threshold. When an individual spike of the two or more spikes arrives at the detector neuron, a detection trace may be incremented. The trace may be configured to decay with time. In some implementations, the time decay may comprise one or more of linear decay, exponential decay, logarithmic decay, and/or other time decays. When two or more individual spikes arrive at the detector neuron, a detection indication may be generated responsive to the trace exceeding a detection threshold. In some implementations, the detection trace may comprise neuron excitability. The neuron excitability may be characterized by, for example, a membrane voltage. The detection threshold may comprise the firing threshold.

Figure 9B:
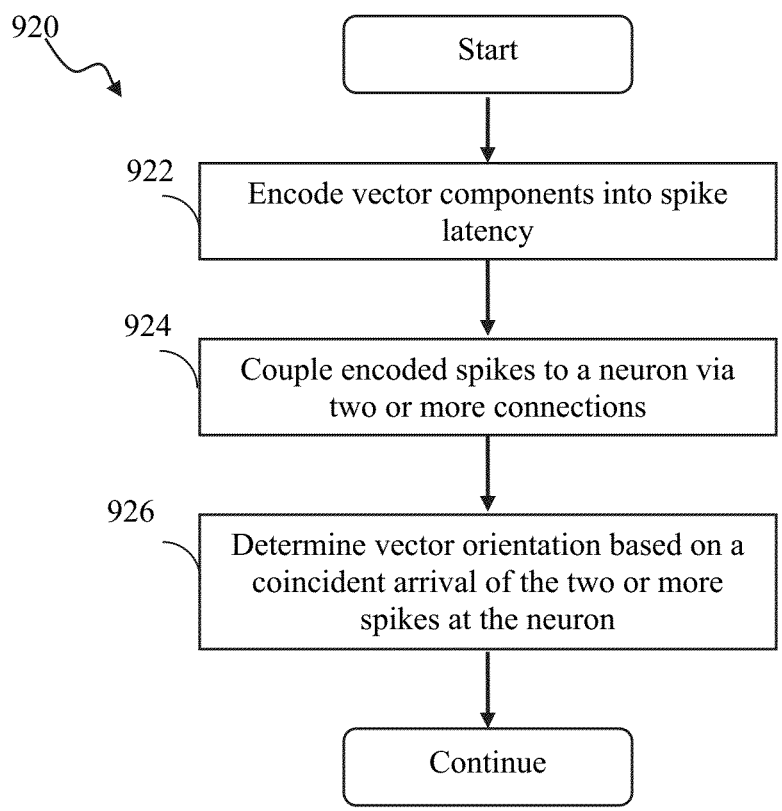
FIG. 9B is a logical flow diagram illustrating a method of vector orientation determination comprising pulse latency encoding, in accordance with one or more implementations.

FIG. 9B illustrates a method 920 of determining an orientation of a multi-component vector using a spiking neuron network, in accordance with one or more implementations. In some implementations, the method 920 of FIG. 9B may be utilized in order to obtain a vector sum of two or more vector components, such as translational and rotational motion of a robotic device 100 of FIG. 1A.

At step 922 of method 920, vector components may be encoded into spike latency, using, for example, Eqn. 4-Eqn. 5.

At step 924, the encoded components may be coupled to one or more detector neurons via two or more connections (e.g., 182, 184 in FIG. 1C). In some implementations, the one or more connections may be characterized by inhibitory efficacy configured in accordance with, for example, Eqn. 6. Individual detector neurons may be configured to respond to input associated with a particular direction (e.g., the neurons 176 of FIG. 1C). Individual ones of the plurality of connections may be characterized by connection delay $\Delta t_i$. In some implementations, connection delay $\Delta t_i$ may be determined using the calibration method described with respect to FIG. 6A.

At step 926, the orientation of the multi-component vector may be determined. In one or more implementations, the orientation may be determined based on and/or responsive to the detection of coincident arrival of the two or more spikes at the detector neuron. In some implementations, the synchronous arrival may be determined based using a threshold, such as described with respect to step 910 of method 900, above.

Various exemplary spiking network apparatus comprising one or more of the methods set forth herein (e.g., self-motion cancellation using spike latency encoding mechanism explained above) are now described with respect to FIGS. 10-11D.

Figure 10:
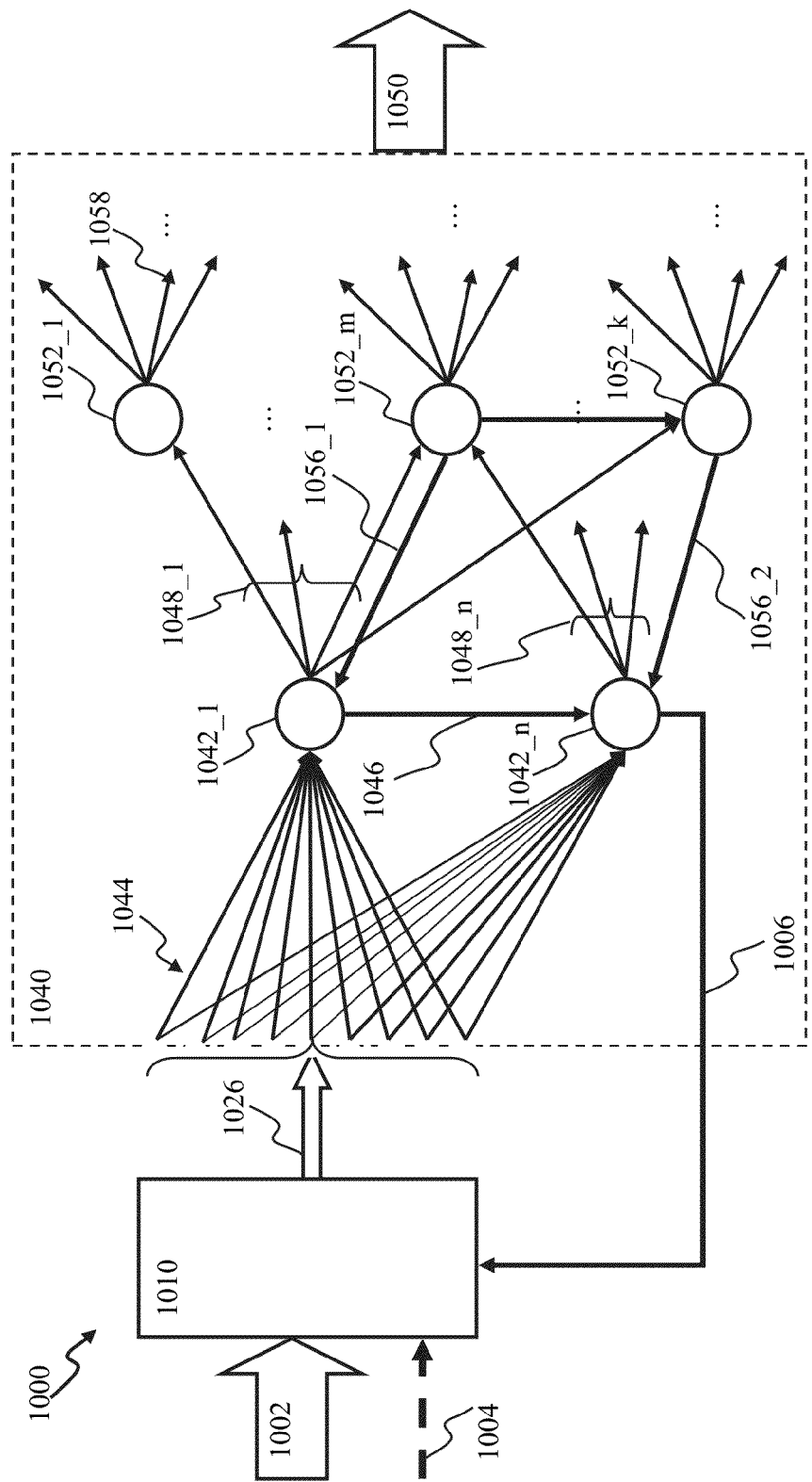
FIG. 10 is a block diagram illustrating sensory processing apparatus configured to implement optic flow cancellation comprising spiking neuron network latency encoding mechanism, in accordance with one or more implementations.

One apparatus for processing of optical flow using a spiking neural network comprising for example the self-motion cancellation mechanism is shown in FIG. 10. The illustrated processing apparatus 1000 may comprise an input interface configured to receive an input sensory signal 1002. In some implementations, this sensory input may comprise electromagnetic waves (e.g., visible light, IR, UV, and/or other types of electromagnetic waves) entering an imaging sensor array. The imaging sensor array may comprise one or more of RGCs, a charge coupled device (CCD), an active-pixel sensor (APS), and/or other sensors. The input signal may comprise a sequence of images and/or image frames. The sequence of images and/or image frame may be received from a CCD camera via a receiver apparatus and/or downloaded from a file. The image may comprise a two-dimensional matrix of RGB values refreshed at a 24 Hz frame rate. It will be appreciated by those skilled in the arts that the above image parameters are merely exemplary, and many other image representations (e.g., bitmap, CMYK, HSV, grayscale, and/or other representations) and/or frame rates are equally useful with the present invention. The apparatus 1000 may be embodied in, for example, an autonomous robotic device, e.g. the device 100 of FIG. 1A.

The apparatus 1000 may comprise an encoder 1010 configured to transform (e.g., encode) the input signal 1002 into an encoded signal 1026. In some implementations, the encoded signal may comprise a plurality of pulses (also referred to as a group of pulses) configured to represent to optical flow due to one or more objects in the vicinity of the robotic device.

The encoder 1010 may receive signal 1004 representing motion of the platform. In one or more implementations, the input 1004 may comprise an output of an inertial sensor block. The inertial sensor block may comprise one or more acceleration sensors and/or acceleration rate of change (i.e., rate) sensors. In one or more implementations, the inertial sensor block may comprise a 3-axis accelerometer and/or 3-axis gyroscope. It will be appreciated by those skilled in the arts that various other motion sensors may be used to characterized motion of a robotic platform, such as, for example, radial encoders, range sensors, global positioning system (GPS) receivers, RADAR, SONAR, LIDAR, and/or other sensors.

The encoder 1010 may comprise one or more spiking neurons. One or more of the spiking neurons of the block 1010 may be configured to encode motion input 1004, such as the neurons 172, 174 in FIG. 1C. One or more of the spiking neurons of the block 1010 may be configured to encode input 1002 into optical flow.

The encoded signal 1026 may be communicated from the encoder 1010 via multiple connections (also referred to as transmission channels, communication channels, or synaptic connections) 1044 to one or more neuronal nodes (also referred to as the detectors) 1042.

In the implementation of FIG. 10, different detectors of the same hierarchical layer may be denoted by a "_n" designator, such that e.g., the designator 1042_1 denotes the first detector of the layer 1042. Although only two detectors (1042_1, 1042_n) are shown in the implementation of FIG. 10 for clarity, it will be appreciated that the encoder may be coupled to any number of detector nodes that is compatible with the detection apparatus hardware and software limitations. Furthermore, a single detector node may be coupled to any practical number of encoders.

In one implementation, individual detectors 1042_1, 1042_n may contain logic (which may be implemented as a software code, hardware logic, or a combination of thereof) configured to recognize a predetermined pattern of pulses in the encoded signal 1026 to produce post-synaptic detection signals transmitted over communication channels 1048. Such recognition may include one or more mechanisms described in co-owned U.S. patent application Ser. No. 12/869,573, filed Aug. 26, 2010 and entitled "SYSTEMS AND METHODS FOR INVARIANT PULSE LATENCY CODING", issued as U.S. Pat. No. 8,315,305 on Nov. 20, 2012, co-owned U.S. patent application Ser. No. 12/869,583, filed Aug. 26, 2010, entitled "INVARIANT PULSE LATENCY CODING SYSTEMS AND METHODS", issued as U.S. Pat. No. 8,467,623 on Jun. 18, 2013, co-owned and co-pending U.S. patent application Ser. No. 13/117,048, filed May 26, 2011 and entitled "APPARATUS AND METHODS FOR POLYCHRONOUS ENCODING AND MULTIPLEXING IN NEURONAL PROSTHETIC DEVICES", co-owned and co-pending U.S. patent application Ser. No. 13/152,084, filed Jun. 2, 2011, entitled "APPARATUS AND METHODS FOR PULSE-CODE INVARIANT OBJECT RECOGNITION", each of the foregoing incorporated herein by reference in its entirety. In FIG. 10, the designators 1048_1, 1048_n denote output of the detectors 1042_1, 1042_n, respectively.

In some implementations, the detection signals may be delivered to a next layer of detectors 1052 (comprising detectors 1052_1, 1052_m, 1052_k) for recognition of complex object features and objects, similar to the exemplary implementation described in commonly owned and co-pending U.S. patent application Ser. No. 13/152,084, filed Jun. 2, 2011, entitled "APPARATUS AND METHODS FOR PULSE-CODE INVARIANT OBJECT RECOGNITION", incorporated supra. In such implementations, individual subsequent layers of detectors may be configured to receive signals from the previous detector layer, and to detect more complex features and objects (as compared to the features detected by the preceding detector layer). For example, a bank of edge detectors may be followed by a bank of bar detectors, followed by a bank of corner detectors and so on, thereby enabling recognition of one or more letters of an alphabet by the apparatus.

Individual detectors 1042 may output detection (post-synaptic) signals on communication channels 1048_1, 1048_n (with appropriate latency) that may propagate with different conduction delays to the detectors 1052. The detector cascade of the implementation of FIG. 10 may contain any practical number of detector nodes and detector banks determined, inter alia, by the software/hardware resources of the detection apparatus and complexity of the objects being detected.

The sensory processing apparatus implementation illustrated in FIG. 10 may further comprise one or more lateral connections 1046.

In some implementations, the apparatus 1000 may comprise feedback connections 1006, 1056, configured to communicate context information from detectors within one hierarchy layer to previous layers, as illustrated by the feedback connections 1056_1, 1056_2 in FIG. 10. In some implementations, the feedback connection 1006 may be configured to provide feedback to the encoder 1010 thereby facilitating sensory input encoding, as described in detail in commonly owned and co-pending U.S. patent application Ser. No. 13/152,084, filed Jun. 2, 2011, entitled "APPARATUS AND METHODS FOR PULSE-CODE INVARIANT OBJECT RECOGNITION", incorporated supra.

Figure 11A:
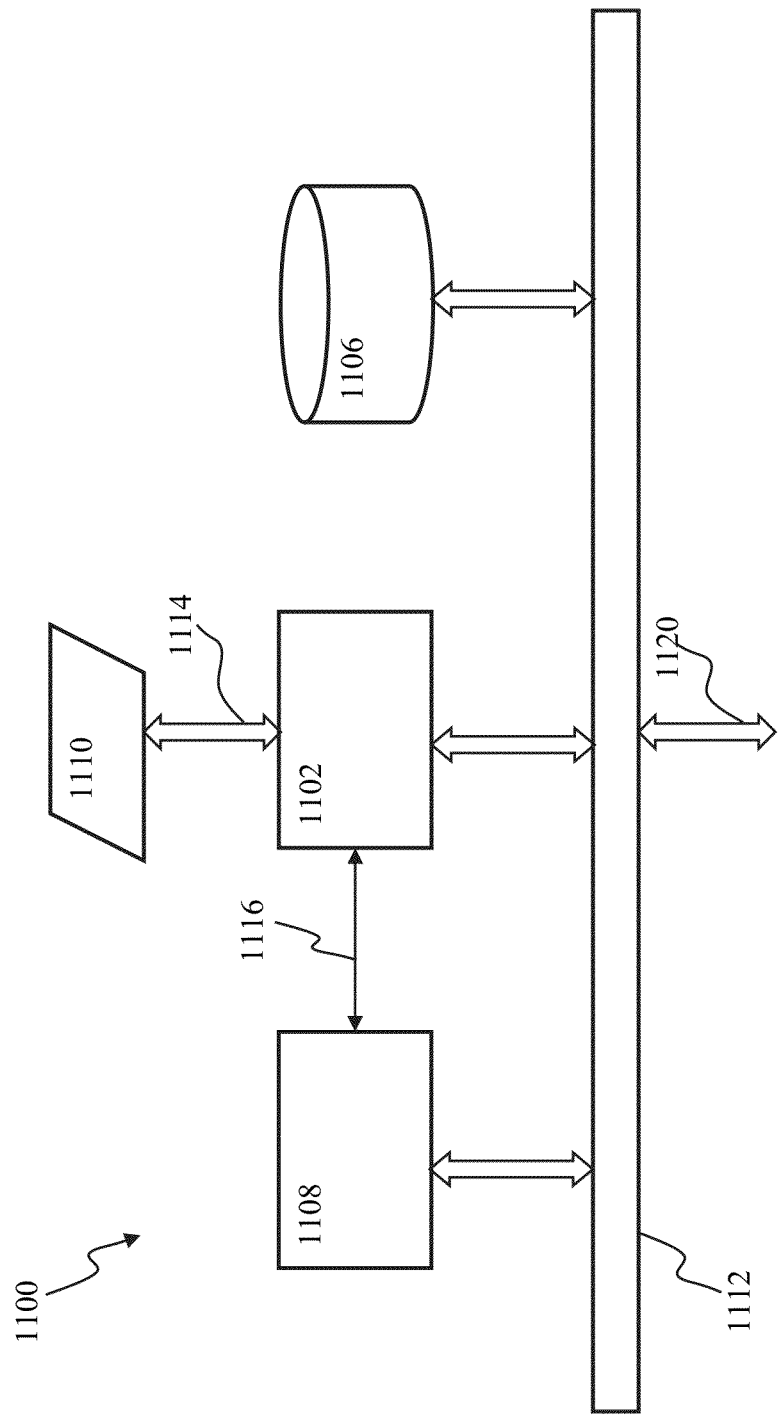
FIG. 11A is a block diagram illustrating computerized system useful for implementing optic flow cancellation mechanism in a spiking neuron network, in accordance with one or more implementations.

One particular implementation of the computerized neuromorphic processing system for operating a computerized spiking network (and implementing the exemplary optical flow encoding methodology described supra) is illustrated in FIG. 11A. The computerized system 1100 of FIG. 11A may comprise an input interface 1110. The input interface 1110 may include one or more of an image sensor, a computerized spiking retina, an audio array, a touch-sensitive input device, and/or other devices. The input interface 1110 may be coupled to the processing block (e.g., a single or multi-processor block) via the input communication interface 1114. The system 1100 may comprise a random access memory (RAM) 1108, configured to store neuronal states and connection parameters (e.g., weights 526 in FIG. 5), and to facilitate synaptic updates. In some implementations, synaptic updates may be performed according to the description provided in, for example, in U.S. patent application Ser. No. 13/239,255 filed Sep. 21, 2011, entitled "APPARATUS AND METHODS FOR SYNAPTIC UPDATE IN A PULSE-CODED NETWORK", incorporated by reference supra.

In some implementations, the memory 1108 may be coupled to the processor 1102 via a direct connection (memory bus) 1116. The memory 1108 may also be coupled to the processor 1102 via a high-speed processor bus 1112).

The system 1100 may comprise a nonvolatile storage device 1106. The nonvolatile storage device 1106 may comprise, inter alia, computer readable instructions configured to implement various aspects of spiking neuronal network operation. Examples of various aspects of spiking neuronal network operation may include one or more of sensory input encoding, connection plasticity, operation model of neurons, other operations, and/or other aspects. In one or more implementations, the nonvolatile storage 1106 may be used to store state information of the neurons and connections for later use and loading previously stored network configuration. The nonvolatile storage 1106 may be used to store state information of the neurons and connections when, for example, saving and/or loading network state snapshot, implementing context switching, saving current network configuration, and/or performing other operations. The current network configuration may include one or more of connection weights, update rules, neuronal states, learning rules, and/or other parameters.

In some implementations, the computerized apparatus 1100 may be coupled to one or more external processing/storage/input devices via an I/O interface 1120. The I/O interface 1120 may include one or more of a computer I/O bus (PCI-E), wired (e.g., Ethernet) or wireless (e.g., Wi-Fi) network connection, and/or other I/O interfaces.

In some implementations, the input/output (I/O) interface may comprise a speech input (e.g., a microphone) and a speech recognition module configured to receive and recognize user commands.

It will be appreciated by those skilled in the arts that various processing devices may be used with computerized system 1100, including but not limited to, a single core/multicore CPU, DSP, FPGA, GPU, ASIC, combinations thereof, and/or other processors. Various user input/output interfaces may be similarly applicable to implementations of the invention including, for example, an LCD/LED monitor, touch-screen input and display device, speech input device, stylus, light pen, trackball, and/or other devices.

Figure 11B:
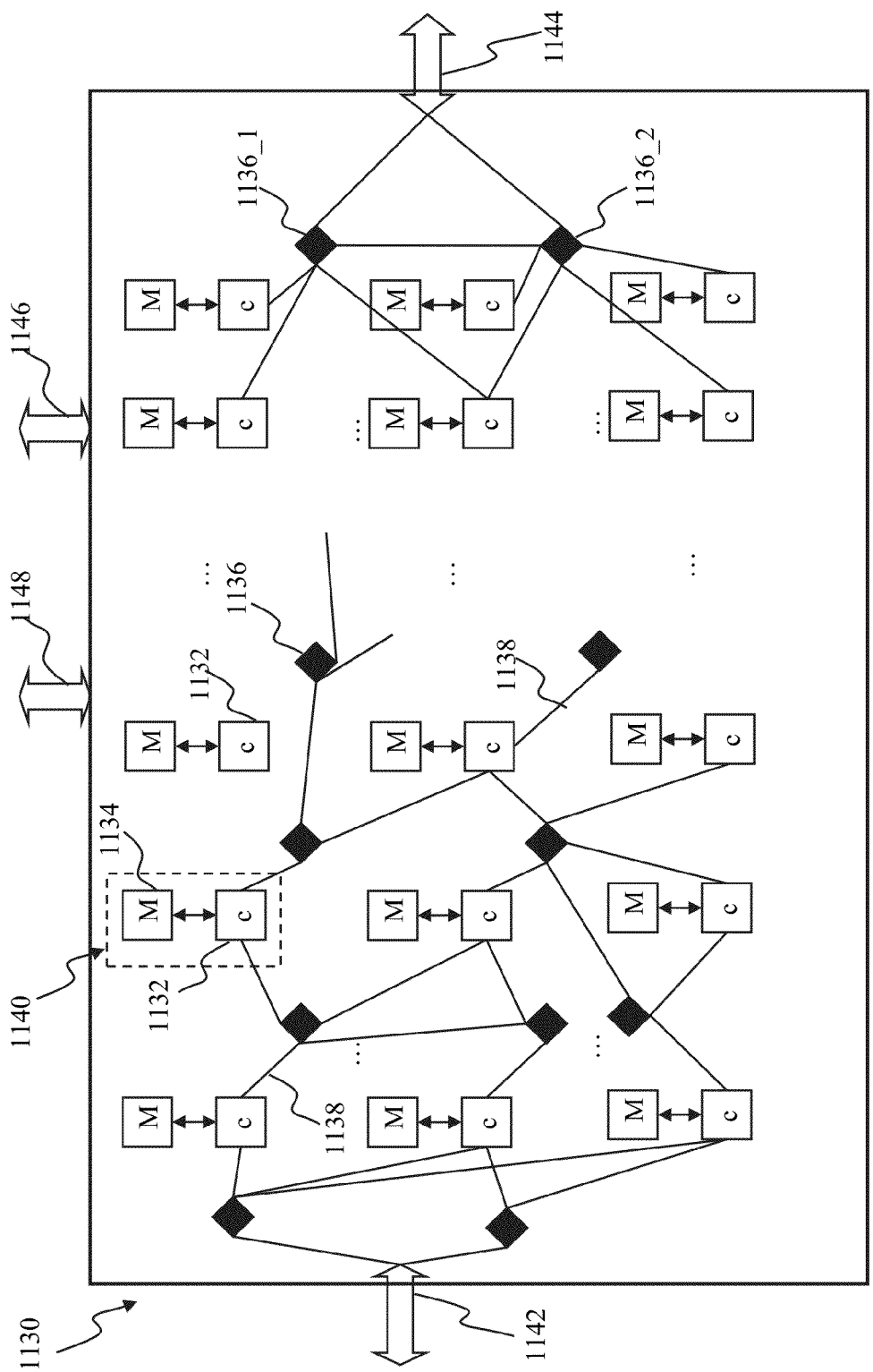
FIG. 11B is a block diagram illustrating a neuromorphic computerized system useful with optic flow cancellation mechanism in a spiking neuron network, in accordance with one or more implementations.

Referring now to FIG. 11B, one implementation of neuromorphic computerized system configured to implement self-motion cancellation mechanism in a spiking network is described in detail. The neuromorphic processing system 1130 of FIG. 11B may comprise a plurality of processing blocks (micro-blocks) 1140. Individual micro cores may comprise a computing logic core 1132 and a memory block 1134. The logic core 1132 may be configured to implement various aspects of neuronal node operation, such as the node model, and synaptic update rules and/or other tasks relevant to network operation. The memory block may be configured to store, inter alia, neuronal state variables and connection parameters (e.g., weights, delays, I/O mapping) of connections 1138.

The micro-blocks 1140 may be interconnected with one another using connections 1138 and routers 1136. As it is appreciated by those skilled in the arts, the connection layout in FIG. 11B is exemplary, and many other connection implementations (e.g., one to all, all to all, and/or other maps) are compatible with the disclosure.

The neuromorphic apparatus 1130 may be configured to receive input (e.g., visual input) via the interface 1142. In one or more implementations, applicable for example to interfacing with computerized spiking retina, or image array, the apparatus 1130 may provide feedback information via the interface 1142 to facilitate encoding of the input signal.

The neuromorphic apparatus 1130 may be configured to provide output (e.g., an indication of recognized object or a feature, or a motor command, e.g., to zoom/pan the image array) via the interface 1144.

The apparatus 1130, in one or more implementations, may interface to external fast response memory (e.g., RAM) via high bandwidth memory interface 1148, thereby enabling storage of intermediate network operational parameters. Examples of intermediate network operational parameters may include one or more of spike timing, neuron state, and/or other parameters. The apparatus 1130 may interface to external memory via lower bandwidth memory interface 1146 to facilitate one or more of program loading, operational mode changes, retargeting, and/or other operations. Network node and connection information for a current task may be saved for future use and flushed. Previously stored network configuration may be loaded in place of the network node and connection information for the current task. External memory may include one or more of a Flash drive, a magnetic drive, and/or other external memory.

Figure 11C:
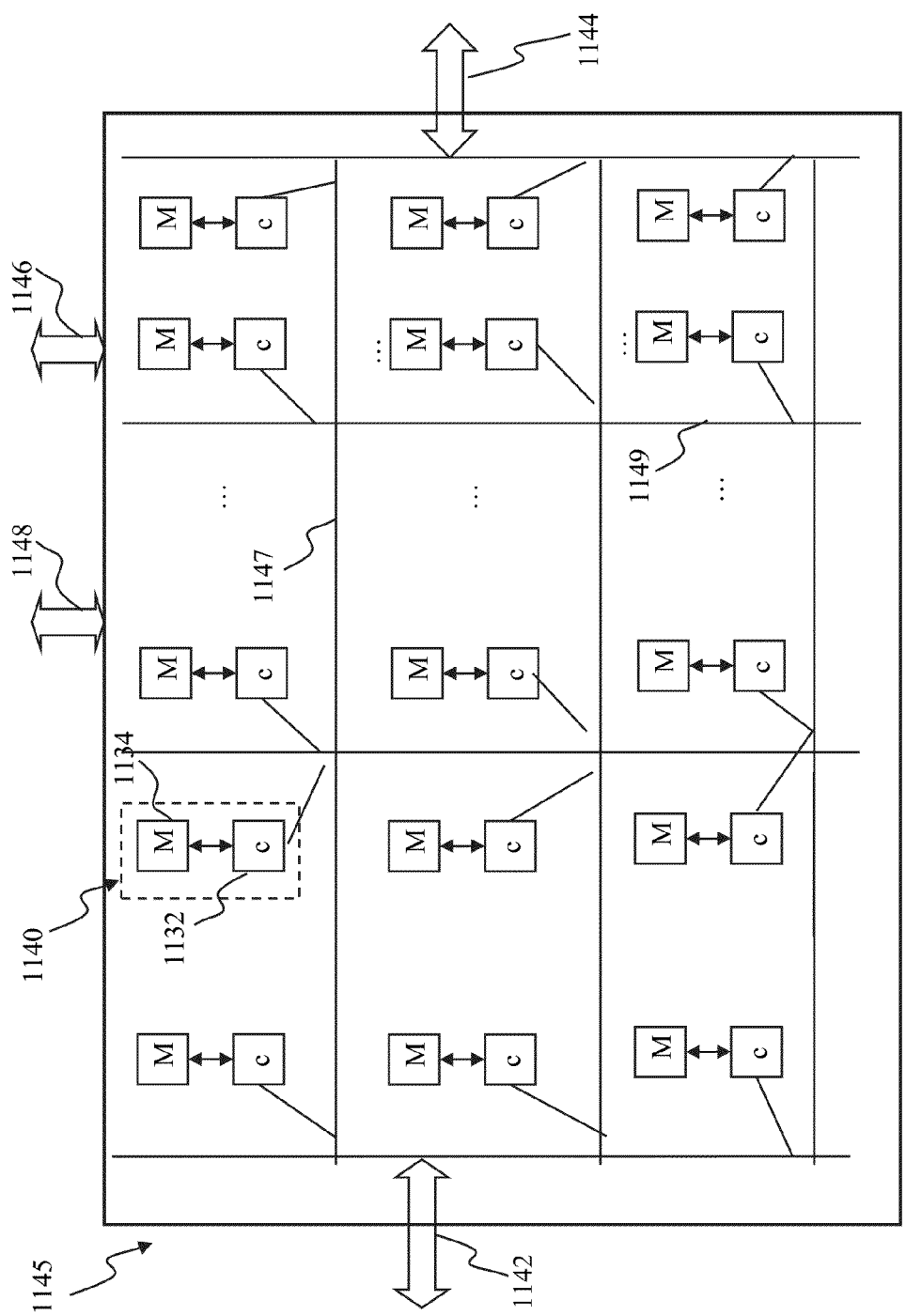
FIG. 11C is a block diagram illustrating a hierarchical neuromorphic computerized system architecture useful with optic flow cancellation mechanism in a spiking neuron network, in accordance with one or more implementations.

FIG. 11C illustrates one or more implementations of shared bus neuromorphic computerized system 1145 comprising micro-blocks 1140, described with respect to FIG. 11B, supra. The system 1145 of FIG. 11C may utilize shared bus 1147, 1149 to interconnect micro-blocks 1140 with one another.

Figure 11D:
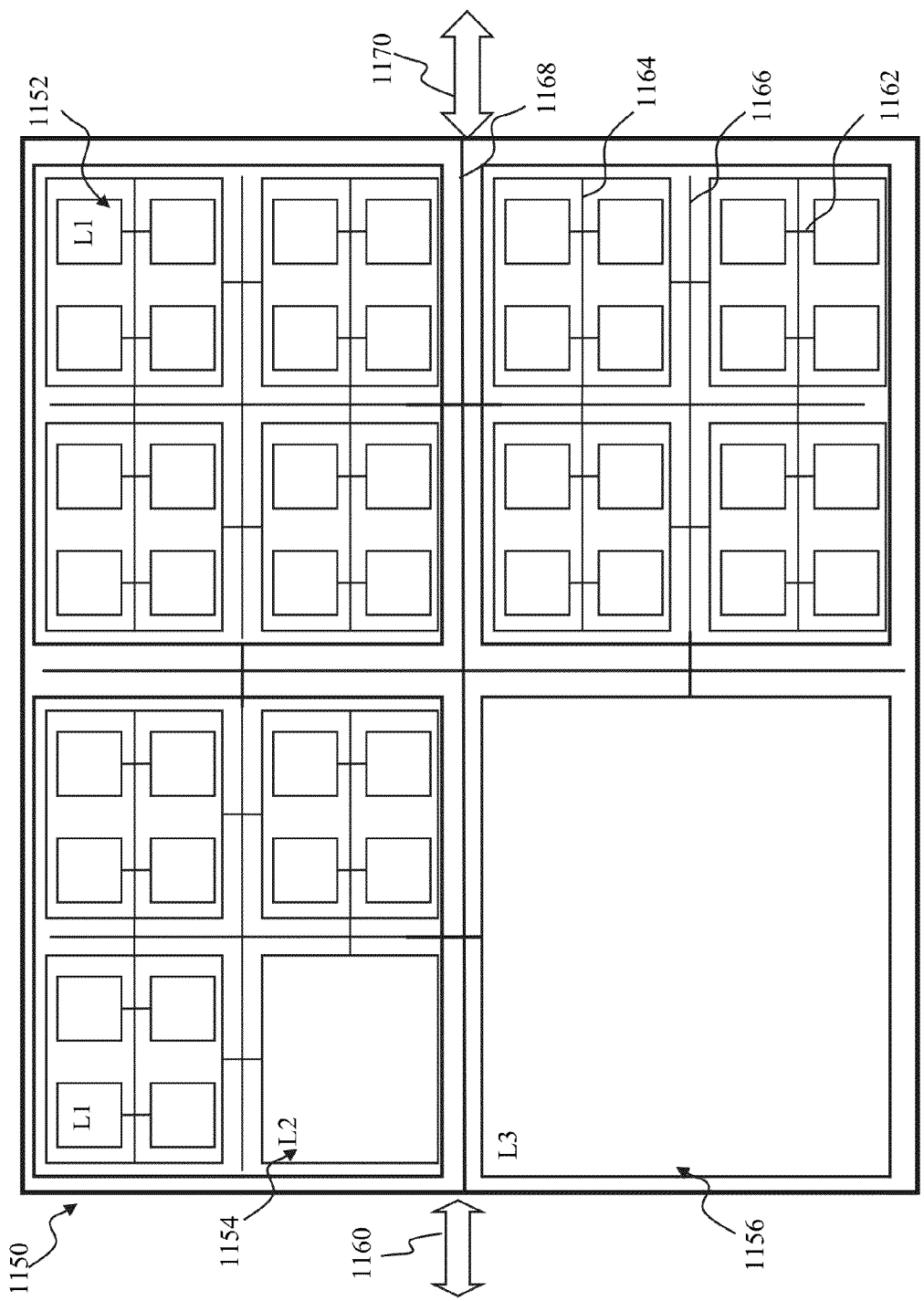
FIG. 11D is a block diagram illustrating cell-type neuromorphic computerized system architecture useful with optic flow cancellation mechanism in a spiking neuron network, in accordance with one or more implementations.

FIG. 11D illustrates one implementation of cell-based neuromorphic computerized system architecture configured to optical flow encoding mechanism in a spiking network is described in detail. The neuromorphic system 1150 may comprise a hierarchy of processing blocks (cells blocks). In some implementations, the lowest level L1 cell 1152 of the apparatus 1150 may comprise logic and memory blocks. The lowest level L1 cell 1152 of the apparatus 1150 may be configured similar to the micro block 1140 of the apparatus shown in FIG. 11B. A number of cell blocks may be arranged in a cluster and may communicate with one another via local interconnects 1162, 1164. Individual clusters may form higher level cell, e.g., cell L2, denoted as 1154 in FIG. 11*d*. Similarly, several L2 clusters may communicate with one another via a second level interconnect 1166 and form a super-cluster L3, denoted as 1156 in FIG. 11D. The super-clusters 1154 may communicate via a third level interconnect 1168 and may form a next level cluster. It will be appreciated by those skilled in the arts that the hierarchical structure of the apparatus 1150, comprising four cells-per-level, is merely one exemplary implementation, and other implementations may comprise more or fewer cells per level, and/or fewer or more levels.

Different cell levels (e.g., L1, L2, L3) of the apparatus 1150 may be configured to perform functionality various levels of complexity. In some implementations, different L1 cells may process in parallel different portions of the visual input (e.g., encode different pixel blocks, and/or encode motion signal), with the L2, L3 cells performing progressively higher level functionality (e.g., object detection). Different ones of L2, L3, cells may perform different aspects of operating a robot with one or more L2/L3 cells processing visual data from a camera, and other L2/L3 cells operating motor control block for implementing lens motion what tracking an object or performing lens stabilization functions.

The neuromorphic apparatus 1150 may receive input (e.g., visual input) via the interface 1160. In one or more implementations, applicable for example to interfacing with computerized spiking retina, or image array, the apparatus 1150 may provide feedback information via the interface 1160 to facilitate encoding of the input signal.

The neuromorphic apparatus 1150 may provide output via the interface 1170. The output may include one or more of an indication of recognized object or a feature, a motor command, a command to zoom/pan the image array, and/or other outputs. In some implementations, the apparatus 1150 may perform all of the I/O functionality using single I/O block (not shown).

The apparatus 1150, in one or more implementations, may interface to external fast response memory (e.g., RAM) via a high bandwidth memory interface (not shown), thereby enabling storage of intermediate network operational parameters (e.g., spike timing, neuron state, and/or other parameters). In one or more implementations, the apparatus 1150 may interface to external memory via a lower bandwidth memory interface (not shown) to facilitate program loading, operational mode changes, retargeting, and/or other operations. Network node and connection information for a current task may be saved for future use and flushed. Previously stored network configuration may be loaded in place of the network node and connection information for the current task.

In one or more implementations, networks of the apparatus 1130, 1145, 1150 may be implemented using Elementarty Network Description (END) language, described for example in U.S. patent application Ser. No. 13/239,123, entitled "ELEMENTARY NETWORK DESCRIPTION FOR NEUROMORPHIC SYSTEMS WITH PLURALITY OF DOUBLETS WHEREIN DOUBLET EVENTS RULES ARE EXECUTED IN PARALLEL", filed Sep. 21, 2011 and issued as U.S. Pat. No. 9,104,973 Aug. 11, 2015, and/or High Level Neuromorphic Description (HLND) framework, described for example in U.S. patent application Ser. No. 13/385,938, entitled "TAG-BASED APPARATUS AND METHODS FOR NEURAL NETWORKS", filed Mar. 15, 2012 and issued as U.S. Pat. No. 8,712,939 on Apr. 29, 2014, each of the foregoing being incorporated herein by reference in its entirety. In one or more implementations, the HLND framework may be augmented to handle event based update methodology described, for example co-pending U.S. patent application Ser. No. 13/588,774, entitled "APPARATUS AND METHODS FOR IMPLEMENTING EVENT-BASED UPDATES IN SPIKING NEURON NETWORKS", filed Aug. 17, 2012, the foregoing being incorporated herein by reference in its entirety. In some implementations, the networks may be updated using an efficient network update methodology, described, for example, in co-pending U.S. patent application Ser. No. 13/560,891, entitled "APPARATUS AND METHODS FOR EFFICIENT UPDATES IN SPIKING NEURON NETWORK", filed Jul. 27, 2012, the foregoing being incorporated herein by reference in its entirety.

The methodology described herein may provide generalized framework for cancellation of self-motion during optical flow encoding. The cancellation methodology described herein provides a computationally efficient way to remove self-motion from optical flow measurements via spike latency encoding. Parallel computation capabilities of spiking neuron networks may further facilitate an increased processing throughput and/or reduce processing time. The cancellation methodology described herein may provide an increased precision and reliability of the optical flow processing compared to techniques that rely on an estimation of self-motion optical flow and subtraction of the self-motion flow estimate from the measurements of ambient optical flow. Differential techniques may be particularly prone to instability and noise when the two estimates are greater compared to the residual value.

Spike-latency encoding of optical flow described herein may utilize a smaller size network in order to encode optical flow of various magnitudes, as the same individual neuron may encode optical flow of different magnitudes. The scheme described herein accomplishes this while using fewer neurons compared to existing implementations such as where vector magnitudes are encoded by neurons instead of spike latencies via Eqn. 3. Latency encoding provides for magnitude invariance thereby enabling a single-run calibration of the optical flow acquisition system. The calibration may utilize a displacement of the robotic platform in an obstacle-free environment so as to enable the optical flow encoder to determine delays between the motion encoder and the optical flow encoder neurons.

Multi-channel latency encoding described herein may be utilized to determine a sum of two or more vector components. In some implementations, the components may comprise rotational and translational motion of the robotic platform.

Computationally efficient self-motion cancellation methodology may be traded for (i) reduction in cost, complexity, size and power consumption of a neuromorphic apparatus that may be required to operate the network; and/or (ii) increase apparatus throughput thereby allowing for networks of higher synapse density. The use of efficient neuron network update framework may reduce neuron network development costs by enabling the users to rely on the framework to implement updates efficiently, which may alleviate additional coding efforts.

In one or more implementations, the self-motion cancellation methodology of the disclosure may be implemented as a software library configured to be executed by a computerized neural network apparatus (e.g., containing a digital processor). In some implementations, the generalized learning apparatus may comprise a specialized hardware module (e.g., an embedded processor or controller). In some implementations, the spiking network apparatus may be implemented in a specialized or general purpose integrated circuit (e.g., ASIC, FPGA, PLD, and/or other integrated circuit). A myriad of other implementations may exist that will be recognized by those of ordinary skill given the present disclosure.

The present disclosure may be used to simplify and improve control tasks for a wide assortment of control applications including, without limitation, industrial control, adaptive signal processing, navigation, and robotics. Exemplary implementations of the present disclosure may be useful in a variety of devices including without limitation prosthetic devices (such as artificial limbs), industrial control, autonomous and robotic apparatus, HVAC, and other electro-mechanical devices requiring accurate stabilization, set-point control, trajectory tracking functionality or other types of control. Examples of such robotic devices may include manufacturing robots (e.g., automotive), military devices, and medical devices (e.g., for surgical robots). Examples of autonomous navigation may include rovers (e.g., for extraterrestrial, underwater, hazardous exploration environment), unmanned air vehicles, underwater vehicles, smart appliances (e.g., ROOMBA®), and/or robotic toys. The present disclosure may be used in all other applications of adaptive signal processing systems (comprising for example, artificial neural networks). Examples of such applications may include one or more of machine vision, pattern detection and pattern recognition, object classification, signal filtering, data segmentation, data compression, data mining, optimization and scheduling, complex mapping, and/or other applications.

It will be recognized that while certain aspects of the disclosure are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the invention. This description is in no way meant to be limiting, but rather should be taken as illustrative of the general principles of the invention. The scope of the disclosure should be determined with reference to the claims.

What is claimed:

1. A computer-implemented method of cancelling optical flow induced by a motion of a robotic apparatus using an artificial spiking neuron network, the method being performed by one or more processors configured to execute computer program modules, the method comprising:
   obtaining an optical flow, the optical flow characterizing displacement associated with a plurality of pixels of an image, the plurality of pixels representing at least one object; and
   based on information characterizing the motion, encoding the optical flow into one or more latencies of one or more pulses;
   wherein the encoding is configured to prevent generation of the one or more pulses based on the optical flow being based solely on the motion of the robotic apparatus and in an absence of motion of the at least one object.

2. The method of claim 1, wherein:
   the plurality of pixels comprises two or more pixel arrays; and
   the optical flow is characterized by one or more velocity vectors associated with individual ones of the plurality of pixels, the one or more velocity vectors being determined based on the two or more pixel arrays.

3. The method of claim 2, wherein:
   individual ones of the two or more pixel arrays comprise a first frame of pixels and a second frame of pixels, the first frame corresponding to a first time instance, the second frame corresponding to a second time instance; and
   the one or more velocity vectors are determined based on a difference of at least one characteristic of a first pixel group of the first frame and a second pixel group of the second frame.

4. The method of claim 2, wherein a subset of latencies corresponding to individual ones of the one or more pulses is based on a first magnitude of the one or more velocity vectors.

5. The method of claim 4, wherein:
   individual ones of the one or more velocity vectors comprise a first portion configured to describe a translational velocity component;
   the first magnitude comprises a magnitude of the first portion; and
   a first latency is based on a logarithm of the first magnitude.

6. The method of claim 5, wherein:
   individual ones of the one or more velocity vectors further comprise a second portion configured to describe a rotational velocity component;
   a second magnitude comprises a magnitude of a vector sum of the first portion and the second portion; and
   a second latency is based on a negated logarithm of an absolute value of the vector sum.

7. The method of claim 2, wherein the one or more pulses comprise:
   a first pulse having a first latency, the first pulse being configured to characterize a magnitude of a first component of the motion; and
   a second pulse having a second latency, the second pulse being configured to characterize a magnitude of a second component of the motion, the first latency and the second latency being configured to be insensitive to a linear transformation of the first and the second components of the motion.

8. The method of claim 7, wherein:
   the second latency comprises a sum of the first latency and a difference component;
   the linear transformation is characterized by a proportional parameter and is configured to produce a transformed first component value that is proportional to the magnitude of the first component and a transformed second component value that is proportional to the magnitude of the second component; and
   the second latency insensitivity being characterized by a constant value of the difference component associated with the transformed first component and the transformed second component.

9. A computer-implemented method of calibrating a spiking neuron network configured to determine optical flow of a robot, the method being performed by one or more processors configured to execute computer program modules, the method comprising:
   coupling a first motion encoding neuron to individual neurons of the spiking neuron network via a first plurality of connections, where individual ones of the first plurality of connections are characterized by a first delay;
   providing an optical flow to the individual neurons of the spiking neuron network, the optical flow being determined based on a first stream of pixels associated with a first motion type of the robot; and
   based on a plurality of responses of the individual neurons of the spiking neuron network, determining a first plurality of delays of individual ones of the first plurality of connections;
   wherein the determination of the first plurality of delays eliminates an optical flow component due to the first motion type of the robot.

10. The method of claim 9, wherein:
    the first motion type comprises a translational motion; and
    the first motion encoding neuron is configured to generate a first pulse based on the translational motion of the robot, a latency of the first pulse being configured based on magnitude of the translational motion.

11. The method of claim 10, further comprising:
    coupling a second motion encoding neuron to other individual neurons of the spiking neuron network via a second plurality of connections, the other individual ones of the second plurality of connections being characterized by a second delay;
    providing another optical flow to the other individual neurons of the spiking neuron network, the another optical flow being determined based on a second stream of pixels associated with an angular motion of the robot; and based on a plurality of responses of the other individual neurons of the spiking neuron network, determining a second plurality of delays of individual ones of the second plurality of connections;

wherein the determination of the second plurality of delays eliminates an optical flow component due to the angular motion of the robot.

12. A computer implemented method of encoding optical flow, the method being performed by one or more processors configured to execute computer program modules, the method comprising:

encoding motion information into one or more motion pulses; and based on the one or more motion pulses, encoding optical flow into one or more pulse latencies;

wherein the optical flow is configured to characterize velocity of at least a portion of a visual data frame.

13. The method of claim 12, wherein:

the encoding of the motion information is effectuated by neurons of a first portion of a spiking neuron network; and the encoding of the optical flow is effectuated by neurons of a second portion of the spiking neuron network, the first portion and the second portion forming a disjoint set.

14. The method of claim 13, wherein:

the optical flow is determined based on a first visual frame and a second visual frame, the first visual frame and the second visual frame each comprising a representation of an object;

the optical flow comprises at least one vector based on a velocity of the object, the at least one vector being characterized by a direction parameter; and a first range of values of the direction parameter is encoded by a first neuron of the second portion.

15. The method of claim 14, wherein:

a second range of values of the direction parameter is configured to be encoded by a second neuron of the second portion, the second neuron being distinct from the first neuron when the second range and the first range form a disjoint set.

16. The method of claim 15, wherein:

the least one vector is characterized by a magnitude parameter;

a first range of values of the magnitude parameter is encoded by the first neuron into a first latency value of the one or more pulse latencies;

a second range of values of the magnitude parameter is encoded by the first neuron into a second latency value of the one or more pulse latencies, the first range and the second range configured to form a disjoint set; and the first latency value being different from the second latency value.

17. The method of claim 12, wherein:

the motion information comprises a rotational component; and the one or more motion pulses comprise a rotational pulse, the rotational pulse being associated with a rotation latency, the rotation latency being proportional to a logarithm of the rotational component.

18. The method of claim 12, wherein:

the motion information comprises a translational component; and the one or more motion pulses comprise a translational pulse, the translational pulse being associated with a translation latency, the translation latency being proportional to a logarithm of the translational component.

19. The method of claim 18, wherein:

the motion information further comprises a rotational component; and the one or more motion pulses further comprise a rotational pulse, the rotational pulse being associated with a rotation latency, the rotation latency being proportional to a logarithm of the rotational component.

20. The method of claim 19, wherein:

the rotational pulse is generated by a rotation neuron of the first portion of the spiking neuron network;

the translational pulse is generated by a translational neuron of the first portion of the spiking neuron network; and a value of the rotational latency and a value of the translational latency are configured to cause coincident arrival of the rotational pulse and the translational pulse at an optical flow encoding neuron of the second group, the optical flow encoding neuron of the second group being configured to encode a velocity direction range, the velocity direction range comprising a direction of a vector sum of the rotational component and the translational component.

21. The method of claim 20, wherein:

the rotational pulse is communicated to neurons of the second group via one or more rotational connections, the one or more rotational connections being characterized by a rotation efficacy;

the translational pulse is communicated to neurons of the second group via one or more translational connections, the one or more translational connections being characterized by a translation efficacy; and the coincident arrival is characterized by a combined motion efficacy of a unity value.

22. The method of claim 20, wherein:

the rotational pulse is communicated to neurons of the second group via one or more rotational connections, the one or more rotational connections being characterized by a rotation inhibitory efficacy having a rotation inhibitory time interval associated therewith;

the translational pulse is communicated to neurons of the second group via one or more translational connections, the one or more translational connections being characterized by a translation inhibitory efficacy a translation inhibitory time interval associated therewith; and the encoding of the motion information is configured to cause an overlap between the rotation inhibitory time interval and the translation inhibitory time interval so that to suppress pulse generation by the optical flow encoding neuron during the overlap.

23. The method of claim 12, wherein:

the optical flow comprises at least one vector characterized by a direction parameter; and the encoding is configured to be effectuated by a plurality of spiking neurons comprising:

a first neuron configured to encode at least a portion of the optical flow associated with a first value of the direction parameter; and a second neuron configured to encode at least a portion of the optical flow associated with a second value of the direction parameter, the second value being different than the first value.

24. The method of claim 12, wherein:

individual ones of the one or more motion pulses are configured to be provided to a robotic apparatus comprising a platform and a motor; the motor being configured to physically displace the platform based on one or more of the motion pulses.

\* \* \* \* \*